(12) United States Patent
Ogaki

(10) Patent No.: US 9,755,397 B2
(45) Date of Patent: Sep. 5, 2017

(54) LIGHT AMPLIFYING DEVICE AND LASER PROCESSING APPARATUS

(71) Applicant: OMRON Corporation, Kyoto-shi, Kyoto (JP)

(72) Inventor: Tatsuo Ogaki, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 206 days.

(21) Appl. No.: 14/885,078

(22) Filed: Oct. 16, 2015

(65) Prior Publication Data

US 2016/0172819 A1   Jun. 16, 2016

(30) Foreign Application Priority Data

Dec. 12, 2014   (JP) ................................. 2014-251645

(51) Int. Cl.
| | |
|---|---|
| *H01S 3/13* | (2006.01) |
| *H01S 3/10* | (2006.01) |
| *H01S 3/23* | (2006.01) |
| *H01S 3/067* | (2006.01) |
| *B23K 26/00* | (2014.01) |
| *H01S 3/16* | (2006.01) |

(52) U.S. Cl.
CPC ........ *H01S 3/1301* (2013.01); *B23K 26/0066* (2013.01); *H01S 3/06754* (2013.01); *H01S 3/10015* (2013.01); *H01S 3/2308* (2013.01); *H01S 3/10069* (2013.01); *H01S 3/1305* (2013.01); *H01S 3/1618* (2013.01)

(58) Field of Classification Search
USPC ........... 219/121.61, 121.8; 359/341.3, 341.4; 372/6, 25, 29.021; 330/4.3
See application file for complete search history.

(56) References Cited

U.S. PATENT DOCUMENTS

| | | | |
|---|---|---|---|
| 2007/0223544 A1* | 9/2007 | Yamazaki | .......... B23K 26/0622 372/29.014 |
| 2011/0019705 A1* | 1/2011 | Adams | ............... B23K 26/0622 372/25 |

FOREIGN PATENT DOCUMENTS

| | | |
|---|---|---|
| JP | 2004-337970 A | 12/2004 |
| JP | 2006-305597 A | 11/2006 |
| JP | 2011-181761 A | 6/2011 |
| JP | 2012-248615 A | 12/2012 |

\* cited by examiner

*Primary Examiner* — Samuel M Heinrich
(74) *Attorney, Agent, or Firm* — Mots Law, PLLC

(57) ABSTRACT

A light amplifying device includes, a light amplifying fiber to amplify a seed beam from a seed light source with an excitation beam from an excitation light source, and a controller. The controller causes the seed light source to emit the seed beam in an emission period in which the light amplifying fiber outputs the amplified light beam, causes the excitation light source to emit the excitation beam having first-level power in a non-emission period immediately before the emission period, and changes the excitation beam power to a second level higher than the first level at a beginning of the emission period. The controller increases the excitation beam power to a third level higher than the second level after starting of the emission period, and decreases gradually the excitation beam power from the third level to the second level.

7 Claims, 17 Drawing Sheets

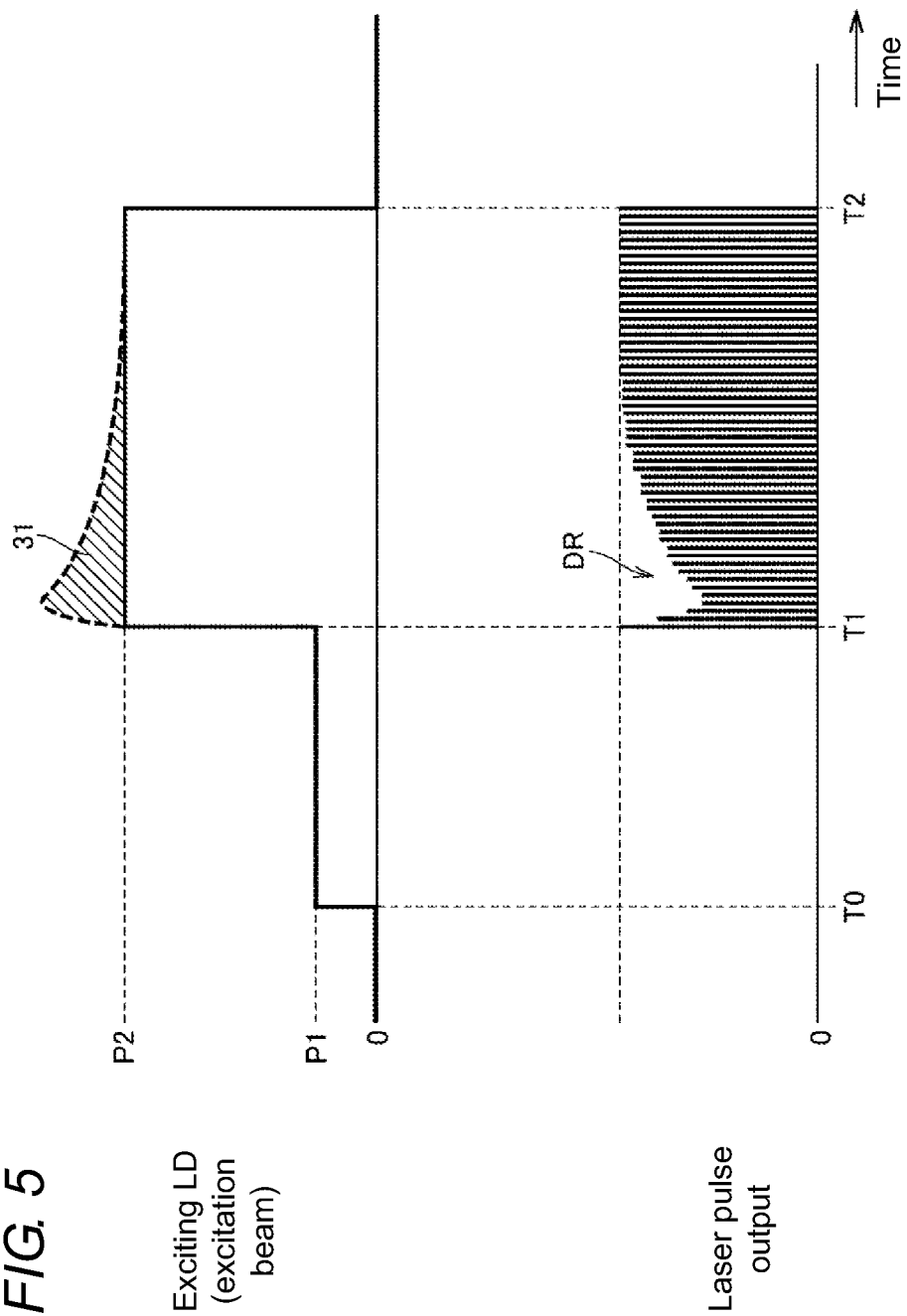

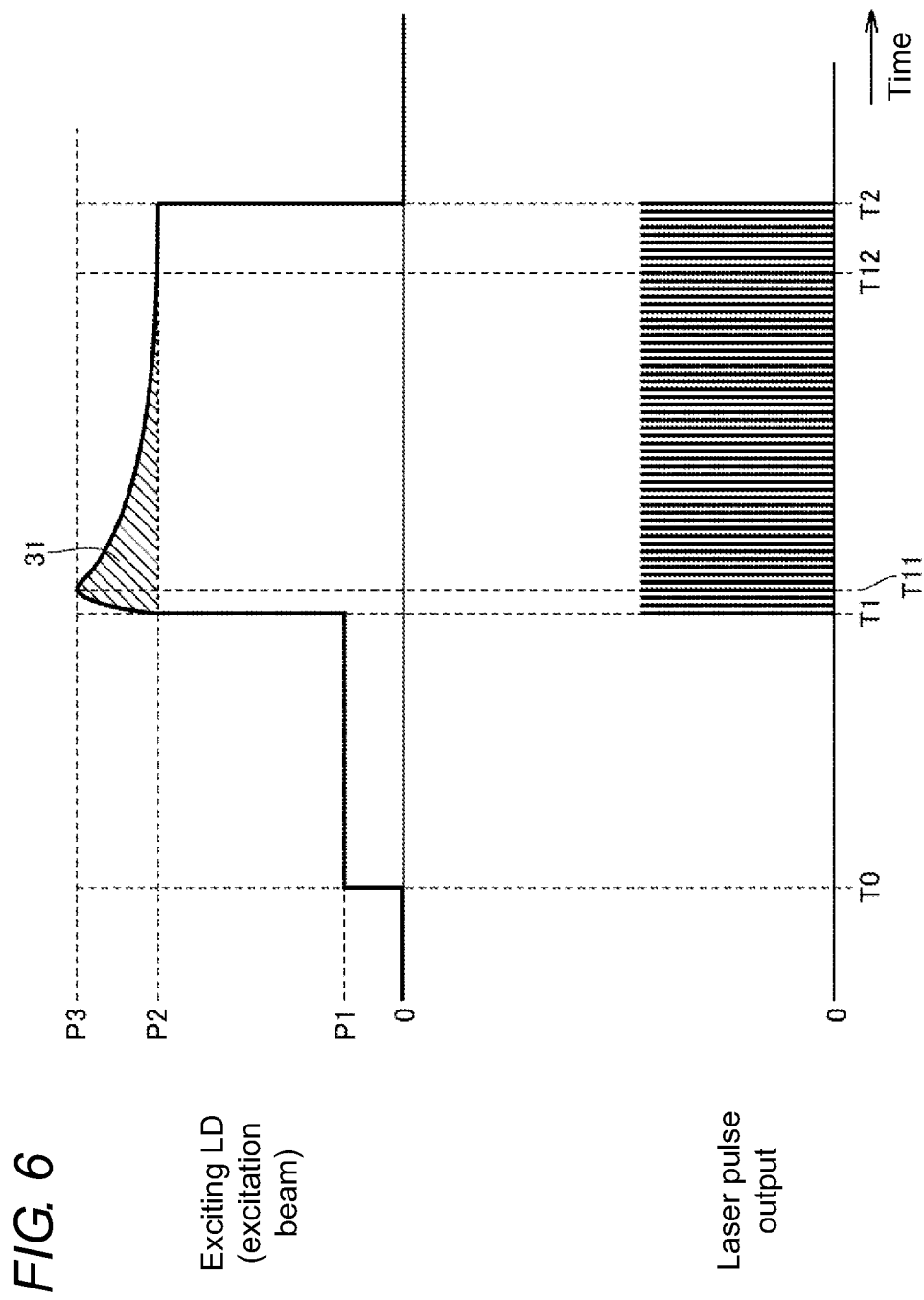

FIG. 9

| Laser pulse output setting value: S1 | | 206 |
|---|---|---|
| a1 : XX | t1 : XX | |
| a2 : XX | t2 : XX | |
| a3 : XX | t3 : XX | |
| a4 : XX | t4 : XX | |
| a5 : XX | t5 : XX | |

(with "Laser pulse output setting value: S2" shown as a stacked tab behind)

| Laser pulse output setting value | Bias current setting value | Coefficient |
|---|---|---|
| P21 | Ip1 | k1 |
| P22 | Ip2 | k2 |
| P23 | Ip3 | k3 |
| ⋮ | ⋮ | ⋮ |

LIGHT AMPLIFYING DEVICE AND LASER PROCESSING APPARATUS

CROSS-REFERENCE TO RELATED APPLICATION

This application is based on Japanese Patent Application No. 2014-251645 filed with the Japan Patent Office on Dec. 12, 2014, the entire contents of which are incorporated herein by reference.

FIELD

The present invention relates to a light amplifying device and a laser processing apparatus, particularly to a technology for stably outputting a laser pulse from an MOPA (Master Oscillator and Power Amplifier)—system fiber amplifier.

BACKGROUND

In a processing laser pulse, because preferably its peak power is homogeneous from starting to ending of laser pulse output, various devises are proposed in order to obtain the homogeneous peak power.

For example, Unexamined Japanese Patent Publication No. 2006-305597 discloses a laser processing apparatus including an opening and closing unit (shutter). The opening and closing unit is disposed on an optical path of a laser beam, which is emitted from a laser emitting unit to reach a collective lens, and alternatively perform blocking and passage of the laser beam. In the laser processing apparatus, immediately before processing operation to focus the laser beam on a processing target to process the processing target, an exciting laser beam source is driven while the opening and closing unit is closed. Then, the opening and closing unit is opened to pass the laser beam on a condition that a laser medium becomes a high excitation state in which light intensity of the laser beam output from the laser medium can process the processing target. Therefore, the light intensity of the laser beam can be kept constant while power consumption is suppressed.

In a laser processing apparatus disclosed in Unexamined Japanese Patent Publication No. 2004-337970, a control unit provides an initial driving current corresponding to laser output higher than a setting laser beam to an excitation unit when a line segment is marked from a starting point of each line segment using the laser beam, and then the control unit provides a driving current corresponding to the setting laser beam to the excitation unit.

In a configuration disclosed in Unexamined Japanese Patent Publication No. 2011-181761, an excitation beam condition is changed in a non-emission period by controlling a driver, whereby energy of a pulsed light beam output from a laser processing apparatus can be stabilized irrespective of a length of the non-emission period.

Unexamined Japanese Patent Publication No. 2012-248615 discloses a light amplifying device in which, based on a detection value of a peak value detector, the power (a bias current of the driver) of the excitation beam is controlled in the non-emission period such that the power is equalized between an initial output light pulse and a final output light pulse in an emission period.

In the laser processing apparatus disclosed in Unexamined Japanese Patent Publication No. 2006-305597, there is a problem in that the opening and closing unit (shutter) is required to cause enlargement of the apparatus and cost increase. In a laser marking apparatus disclosed in Unexamined Japanese Patent Publication No. 2004-337970, there is a problem in that the homogeneous processing can hardly be performed because the laser output rises gradually from reference time.

On the other hand, in a laser processing apparatus disclosed in Unexamined Japanese Patent Publication No. 2011-181761 and the light amplifying device and laser processing apparatus disclosed in Unexamined Japanese Patent Publication No. 2012-248615, the peak power having the homogeneous laser pulse can be obtained from a beginning of laser pulse output.

However, sometimes the peak power of the laser pulse becomes unstable even in the laser processing apparatus disclosed in Unexamined Japanese Patent Publication No. 2011-181761 and the light amplifying device and laser processing apparatus disclosed in Unexamined Japanese Patent Publication No. 2012-248615. Therefore, there is a demand for a configuration capable of stably outputting the laser pulse having the homogeneous peak power from the beginning of the laser pulse output.

SUMMARY

According to one aspect of the present invention, a light amplifying device includes: a seed light source configured to emit a pulsed seed beam; an excitation light source configured to emit an excitation beam; a light amplifying fiber configured to amplify the seed beam with the excitation beam; and a controller configured to control light beams emitted from the seed light source and the excitation light source. The controller causes the seed light source to emit the seed beam in an emission period in which the light amplifying fiber outputs the amplified light beam, the controller causes the excitation light source to emit the excitation beam having first-level power in a non-emission period immediately before the emission period, and changes the power of the excitation beam emitted from the excitation light source to a second level higher than the first level at a beginning of the emission period, and the controller increases the power of the excitation beam emitted from the excitation light source to a third level higher than the second level after starting of the emission period, and decreases gradually the power of the excitation beam from the third level to the second level.

Preferably, after the starting of the emission period, a time necessary for the change in power of the excitation beam from the second level to the third level is shorter than a time necessary for return of power of the excitation beam from the third level to the second level.

Preferably, the power of the excitation beam emitted from the excitation light source depends on a driving current supplied to the excitation light source, and the controller decreases stepwise the driving current supplied to the excitation light source after the starting of the emission period.

More preferably, the controller changes the driving current according to a previously-stored setting value in which the driving current is defined in each time interval.

More preferably, the controller sequentially decreases the driving current with a predetermined ratio.

Preferably, the controller includes: a unit configured to detect a temporal change in power of the amplified light beam output from the light amplifying fiber; and a unit configured to decide a pattern temporally changing the power of the excitation beam after the starting of the emission period based on the temporal change in power of the amplified light beam detected.

According to another aspect of the present invention, a laser processing apparatus includes: the light amplifying device; and a scanning mechanism configured to irradiate a processing target with the amplified light beam output from the light amplifying device.

Accordingly, the present invention can provide the light amplifying device and the laser processing apparatus capable of stably outputting the laser pulse having the homogeneous peak power from the beginning of the laser pulse output.

BRIEF DESCRIPTION OF THE DRAWINGS

FIG. 5 is a diagram illustrating an outline of solutions adopted in the light amplifying device of the embodiment;

FIG. 6 is a diagram illustrating an outline of solutions adopted in the light amplifying device of the embodiment;

FIG. 9 is a diagram illustrating an example of a parameter set held by a correction pattern holder in FIG. 8;

FIG. 11 is a diagram illustrating an example of the parameter set providing the approximate pattern in FIG. 10;

DETAILED DESCRIPTION

Figure 1:
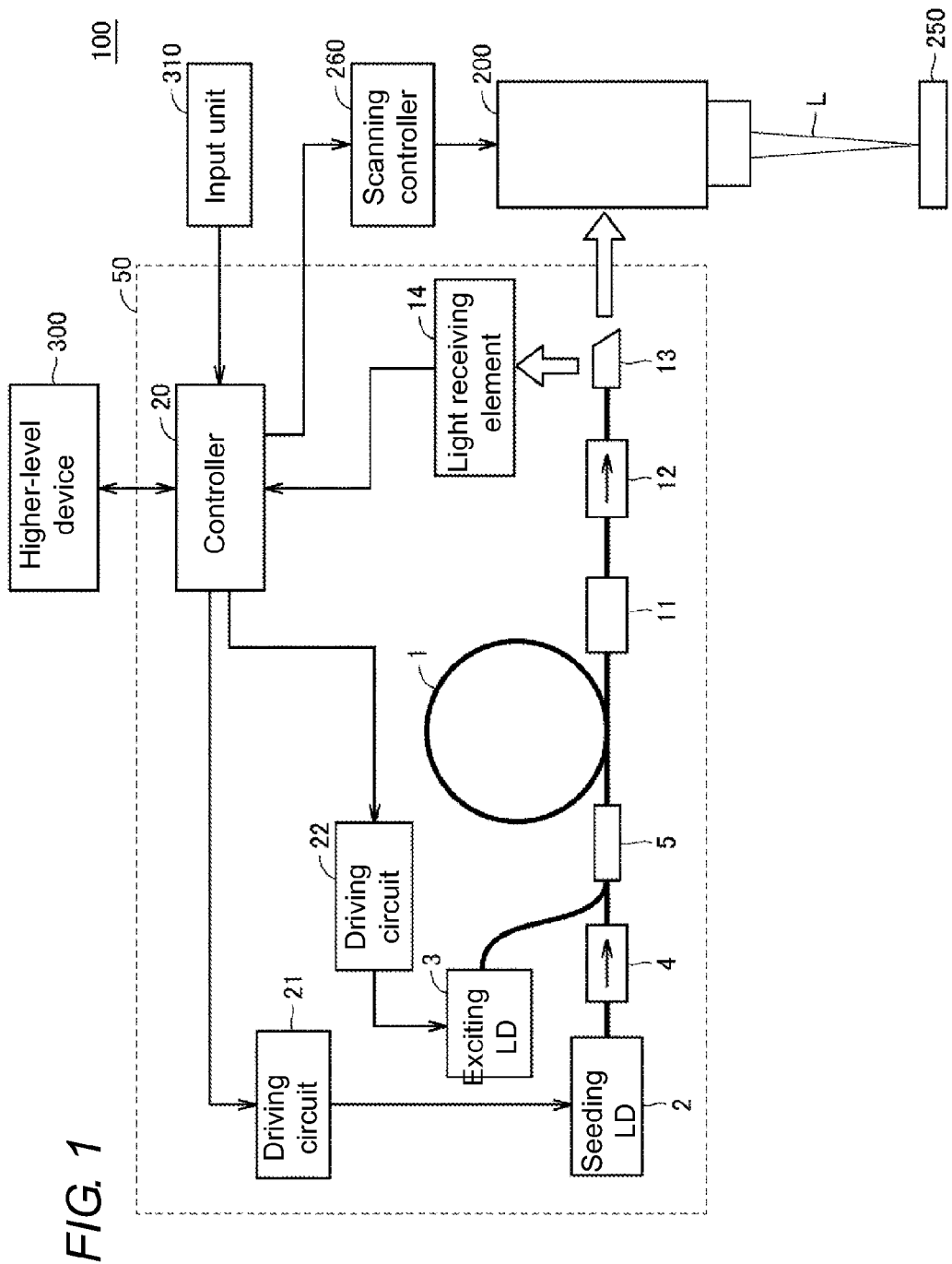
FIG. 1 is a diagram illustrating a configuration example of a laser processing apparatus according to an embodiment.

Hereinafter, an embodiment of the present invention will be described with reference to the drawings. In the drawings, the identical or equivalent component is designated by the identical symbol, and the overlapping description is omitted. In the embodiment, a laser processing apparatus including the light amplifying device is described as an application example of a use form of the light amplifying device. The uses of the light amplifying device of the embodiment is not limited to the laser processing apparatus, but can be applied to any apparatus.

A. Apparatus Configuration

Apparatus configurations of the light amplifying device and the laser processing apparatus including the light amplifying device according to the embodiment of the present invention will be described. FIG. 1 is a diagram illustrating a configuration example of the laser processing apparatus of the embodiment.

Referring to FIG. 1, a laser processing apparatus 100 includes a light amplifying device 50 and a scanning mechanism 200 that performs scanning with a laser beam emitted from the light amplifying device 50. The light amplifying device 50 of the laser processing apparatus 100 outputs a laser beam in which intensity changes periodically into a pulsed shape. Therefore, the laser beam output from the light amplifying device 50 is also referred to as a "laser pulse". In the following description, unless otherwise noted, the "laser pulse" means the laser beam including one or a plurality of pulses. A maximum value of the intensity (power) of each pulse included in the "laser pulse" is collectively called "peak power". Typically, an envelope of the power of the "laser pulse" corresponds to the "peak power".

Typically, the light amplifying device 50 includes a fiber amplifier having an MOPA (Master Oscillator and Power Amplifier) system. More specifically, the light amplifying device 50 includes one fiber amplifier, namely, includes a light amplifying fiber 1, a seeding laser diode 2, an exciting laser diode 3, isolators 4 and 12, a combiner 5, a coupler 7, a pump damper 11, an end cap 13, a driving circuit 21, a light receiving element 14, and a controller 20. Hereinafter, the laser diode is also simply referred to as an "LD".

The light amplifying fiber 1, the seeding LD 2, and the exciting LD 3 are basic components of the MOPA-system fiber amplifier.

The light amplifying fiber 1 includes a core and a clad provided around the core. A rare-earth element of a light amplifying component is added to the core. There is no particular limitation to a kind of the rare-earth element added to the core. For example, Yb (ytterbium), Er (erbium), and Nd (neodymium) can be used as the rare-earth element added to the core. In the embodiment, the light amplifying fiber to which Yb is added as the rare-earth element is described by way of example. The light amplifying fiber 1 may be a single clad fiber in which a one-layer clad is provided around a core or a double clad fiber in which a two-layer clad is provided around the core.

The light amplifying fiber 1 amplifies a seed beam from the seeding LD 2 using an excitation beam from the exciting LD 3. That is, in the MOPA-system fiber amplifier, the excitation beam from the exciting LD 3 and the pulsed seed beam from the seeding LD 2 are provided to the light amplifying fiber 1. The excitation beam incident on the light amplifying fiber 1 is absorbed by atoms of the rare-earth element included in the core, thereby exciting the atoms. When the seed beam propagates through the core of the light amplifying fiber 1 while the atoms are excited, induced emission of the atoms excited by the seed beam is generated to amplify the seed beam. Thus, the light amplifying fiber 1 amplifies the seed beam using the excitation beam.

The seeding LD 2 is a laser beam source, and a seed light source emitting the seed beam. For example, a wavelength of the seed beam is selected from a range of 1000 nm to 1100 nm. In response to an instruction from the controller 20, the driving circuit 21 repeatedly applies a pulsed current to the seeding LD 2 to pulse-drive the seeding LD 2. That is, the seeding LD 2 emits the pulsed seed beam.

The seed beam emitted from the seeding LD 2 is incident on the light amplifying fiber 1 through the isolator 4. The isolator 4 has a function of passing a light beam only in one direction, and blocking a light beam incident in an opposite direction. In the light amplifying device 50, the isolator 4 blocks a return light beam from the light amplifying fiber 1 while passing the seed beam from the seeding LD 2. This enables the return light beam from the light amplifying fiber 1 to be prevented from being incident on the seeding LD 2. This is because there is a risk of damaging the seeding LD 2 in the case that the return light beam from the light amplifying fiber 1 is incident on the seeding LD 2.

The exciting LD 3 is a laser beam source, and an excitation light source that emits the excitation beam in order to excite the atoms of the rare-earth element added to the core of the light amplifying fiber 1. In the case that Yb is added to the rare-earth element, for example, the wavelength of the excitation beam is set to 915±10 nm, for example. The driving circuit 22 drives the exciting LD 3.

The seed beam from the seeding LD 2 and the excitation beam from the exciting LD 3 are coupled by the combiner 5, and incident on the light amplifying fiber 1.

In the case that the light amplifying fiber 1 is the single clad fiber, both the seed beam and the excitation beam are incident on the core. On the other hand, in the case that the light amplifying fiber 1 is the double clad fiber, the seed beam is incident on the core, and the excitation beam is incident on a first clad. The first clad of the double clad fiber acts as a waveguide for the excitation beam. In a process in which the excitation beam incident on the first clad propagates through the first clad, the rare-earth element in the core is excited by a mode in which the excitation beam is passed through the core.

The seed beam (laser pulse) amplified by the light amplifying fiber 1 is output toward the scanning mechanism 200.

The pump damper 11, the isolator 12, and the end cap 13 are provided on an optical path from the light amplifying fiber 1 to the scanning mechanism 200. The pump damper 11 is a kind of optical filter, and removes an unnecessary wavelength component included in the laser pulse amplified by the light amplifying fiber 1. The isolator 12 passes the seed beam (laser pulse), which is amplified by and output from the light amplifying fiber 1, and blocks the light beam returning to the light amplifying fiber 1. The laser pulse passed through the isolator 12 is output into air from an end face of the optical fiber. The end cap 13 is provided in order to prevent damage that is generated at a boundary between the end face of the optical fiber and the air when the laser pulse having high peak power is output into the air from the optical fiber.

The light receiving element 14 is provided adjacent to the end cap 13. The light receiving element 14 partially receives the laser pulse output into the air from the optical fiber, and outputs a signal indicating intensity of the laser pulse to the controller 20. For example, the light receiving element 14 includes a photodiode. The signal output from the light receiving element 14 may include the peak power (peak value) of the received laser pulse.

The laser pulse output into the air from the end face of the optical fiber is provided to the scanning mechanism 200 as a processing laser beam. A shutter may be provided between the end cap 13 and the scanning mechanism 200 such that the processing laser beam is prevented from being output to an outside of the light amplifying device 50.

The scanning mechanism 200 irradiates a processing target 250 with the light beam (laser pulse) amplified by the light amplifying device 50. That is, the scanning mechanism 200 two-dimensionally scans the processing target 250 with the laser pulse (processing laser beam) provided from the light amplifying device 50. For example, the scanning mechanism 200 includes a collimator lens (not illustrated) that adjusts a beam diameter of the laser pulse that is the light beam output from the end cap 13 to a predetermined size, a Galvano scanner (not illustrated) that two-dimensionally scans a surface of the processing target 250 with the laser pulse passed through the collimator lens, and an fθ lens (not illustrated) that collects the laser pulse. The surface of the processing target 250 made of metal or the like is processed by two-dimensionally scanning the surface of the processing target 250 with the laser beam, namely, the laser pulse from the light amplifying device 50. For example, information including a character or a graphic is printed (marked) in the surface of the processing target 250.

A scanning controller 260 issues an instruction to the scanning mechanism 200. The scanning controller 260 wholly controls the laser processing apparatus 100 in conjunction with the controller 20.

The controller 20 mainly controls the emission of the seeding LD 2 (seed light source) and the exciting LD 3 (excitation light source). More specifically, the controller 20 receives the instruction necessary for the control of the scanning mechanism 200 from a higher-level device 300, and receives a user's manipulation through an input unit 310. The controller 20 controls the driving circuits 21 and 22 according to the user's manipulation from the input unit 310, and issues the necessary instruction to the scanning mechanism 200.

Any hardware may be used as the controller 20 as long as the hardware issues the control instruction. For example, the controller 20 may be implemented using a computer executing a predetermined program. For example, a mouse, a keyboard, and a touch panel can be used as the input unit 310.

Characteristics of optical elements such as the seeding LD 2, the exciting LD 3, and the isolators 4 and 12 can change depending on temperature. Therefore, more preferably a temperature controller is provided in the laser processing apparatus 100 in order to keep the temperature of the optical element constant.

B. Light Amplifying Operation

Figure 2:
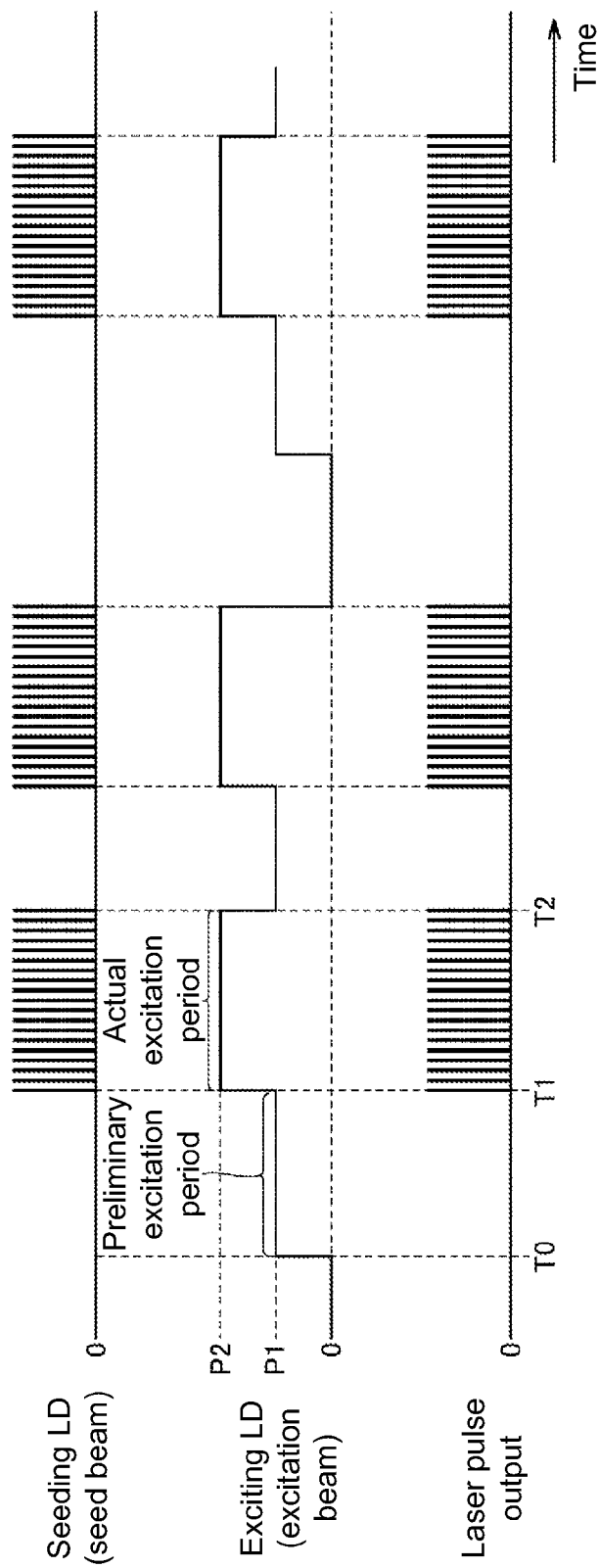
FIG. 2 is a diagram illustrating a light amplifying operation in a light amplifying device of the embodiment.

A light amplifying operation in the light amplifying device 50 of the embodiment will be described below. FIG. 2 is a diagram illustrating the light amplifying operation in the light amplifying device 50 of the embodiment. In FIG. 2, emission timing and a waveform of each of the seeding LD 2 and the exciting LD 3 and output timing and a waveform of the laser pulse output from the light amplifying fiber 1 are illustrated in parallel on an identical time axis.

A preliminary excitation system, in which the excitation beam is previously provided to the light amplifying fiber 1 such that the laser pulse having the homogeneous peak power is obtained from the beginning of the laser pulse output, is used in the light amplifying device 50 of the embodiment. As illustrated in FIG. 2, the seeding LD 2 provides the excitation beam having power P1 (first-level power) to the light amplifying fiber 1 in a predetermined period (a period between a clock time T0 and a clock time T1: hereinafter, also referred to as a "preliminary excitation period") immediately before output timing (clock time T1) of the laser pulse, and the seeding LD 2 provides the excitation beam having power P2 (>P1) (second-level power) to the light amplifying fiber 1 in a laser pulse output period (a period between the clock time T1 and the clock time T2: hereinafter, also referred to as an "actual excitation period").

On the other hand, the seeding LD 2 provides the pulsed seed beam to the light amplifying fiber 1 in the laser pulse output period (the period between the clock time T0 and the clock time T1: the actual excitation period). The atoms are previously excited in the light amplifying fiber 1 when the excitation beam is provided to the light amplifying fiber 1 in the preliminary excitation period. At this point, the pulsed seed beam is incident on the light amplifying fiber 1, which allows the laser pulse having the previously-set peak power to be output from the beginning (clock time T1) of the laser pulse output.

The intensity of the laser beam emitted from each of the seeding LD 2 and the exciting LD 3 is controlled by a bias current supplied from each driving circuit. That is, the controller 20 adjusts the bias current supplied from the driving circuit, thereby controlling the power and the waveform of each of the seed beam and the excitation beam.

The laser pulse output period (actual excitation period) corresponds to the emission period in which the light amplifying fiber 1 outputs the amplified light beam as a pulse string. Generally, the laser is classified into a pulse system (pulse laser) and a continuous oscillation system (CW (Continuous Wave) laser) according to oscillation operation. The light amplifying device 50 of the embodiment is aimed at the pulse system, and the pulsed beam is emitted in the emission period.

The preliminary excitation period immediately before the actual excitation period corresponds to the non-emission period. That is, the controller 20 causes the seeding LD 2 (seed light source) to emit the seed beam in the emission period in which the light amplifying fiber 1 outputs the amplified light beam. The controller 20 causes the exciting LD 3 (excitation light source) to emit the excitation beam having the first-level power (power P1) in the non-emission period immediately before the emission period, and the controller 20 changes the power of the excitation beam emitted from the exciting LD 3 (excitation light source) to the second level (power P2) higher than the first level (power P1) at the beginning of the emission period.

The driving circuit 22 supplies the bias current to the exciting LD 3 to generate the excitation beam in both the preliminary excitation period and the actual excitation period. The power of the excitation beam emitted from the exciting LD 3 (excitation light source) depends on a driving current (hereinafter, also referred to as a "bias current") supplied to the exciting LD 3. Therefore, the bias current supplied to the exciting LD 3 in the preliminary excitation period is smaller than the bias current supplied in the actual excitation period. This enables the exciting LD 3 to emit the excitation beam having the power P1 (first-level power) in the preliminary excitation period, and to emit the excitation beam having the power P2 (second-level power) in the actual excitation period.

On the other hand, the driving circuit 21 supplies the pulsed bias current to the seeding LD 2 only in the actual excitation period to generate the pulsed seed beam. The driving circuit 21 adjusts a pulse period (repetitive frequency) of the supplied bias current to control a pulse period (repetitive frequency) of the seed beam provided to the light amplifying fiber 1, namely, the output laser pulse to a target value. In response to the instruction from the controller 20, the driving circuit 21 changes the peak power and pulse period of the laser pulse output from the light amplifying fiber 1.

The power P1 of the excitation beam incident on the light amplifying fiber 1 in the preliminary excitation period and the power P2 of the excitation beam incident on the light amplifying fiber 1 in the actual excitation period are fixed such that the power of the laser pulse is optimized immediately after the beginning of the laser pulse output. In the case that the excitation beam has the relatively small power P1 in the preliminary excitation period, excitation energy accumulated in the light amplifying fiber 1 decreases relatively, and therefore sometimes the power of the laser pulse immediately after the beginning of the laser pulse output is lower than the original setting value. On the other hand, in the case that the excitation beam has the relatively large power P1 in the preliminary excitation period, the excitation energy accumulated in the light amplifying fiber 1 increases relatively, and therefore sometimes the power of the laser pulse immediately after the beginning of the laser pulse output is larger than the original setting value.

In both the cases, the power of the laser pulse output in the actual excitation period varies temporally, which may cause degradation of processing quality.

For this reason, the power P1 of the excitation beam incident on the light amplifying fiber 1 in the preliminary excitation period and the power P2 of the excitation beam incident on the light amplifying fiber 1 in the actual excitation period are optimally set such that the power of the laser pulse output in the actual excitation period is temporally kept constant.

C. Problem

Figure 3:
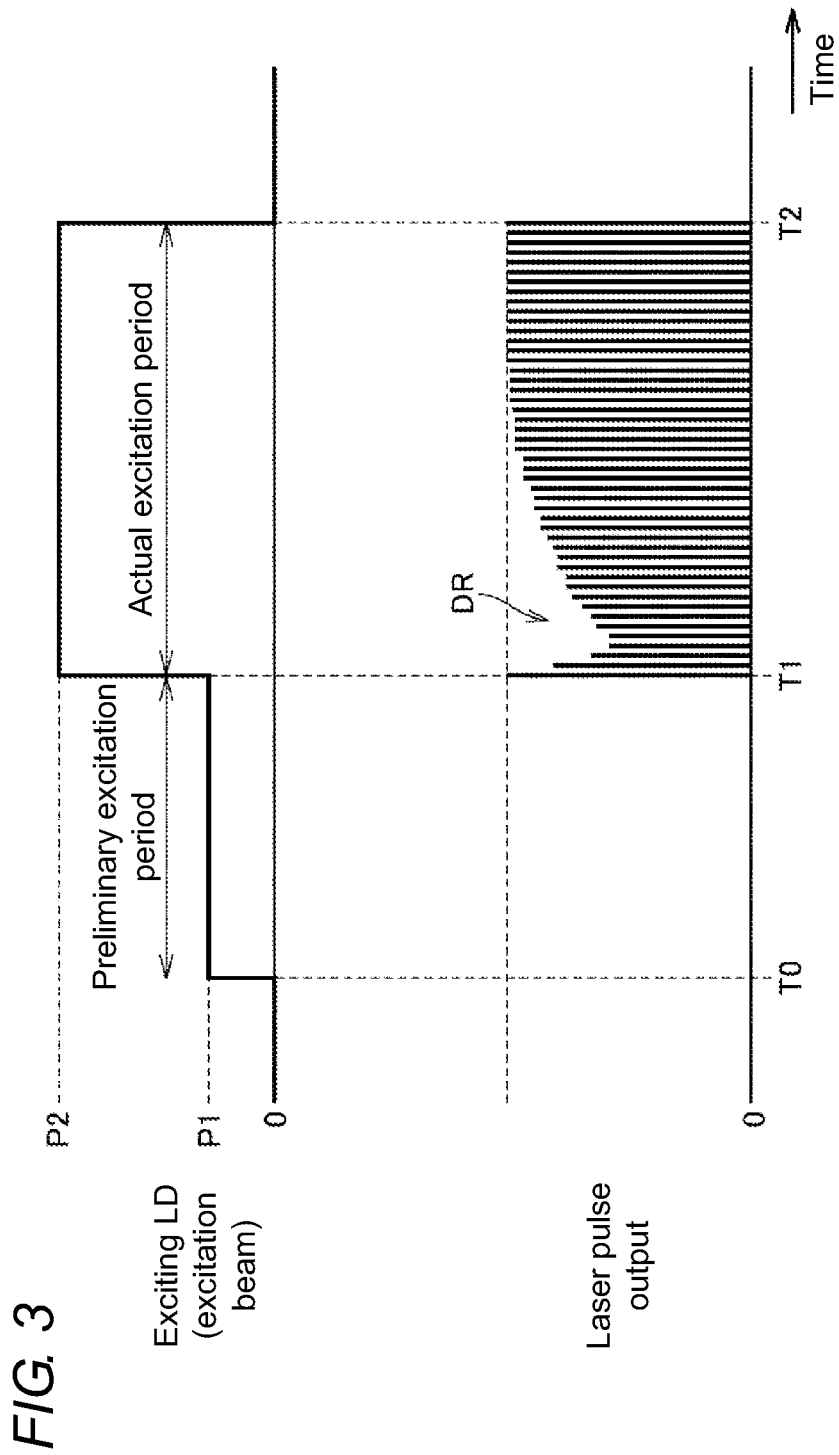
FIG. 3 is a diagram illustrating a problem to be solved by the laser processing apparatus of the embodiment.

A new problem found by the inventor of the present application will be described below. FIG. 3 is a diagram illustrating the problem to be solved by the laser processing apparatus of the embodiment.

The inventor of the present application used the preliminary excitation system to find the new problem in that the power of the output laser pulse can temporally vary even if the power of the excitation beam is optimized in both the preliminary excitation period and the actual excitation period. In the example of FIG. 3, the initial laser pulse having the power immediately after the beginning of the laser pulse output is equal to a stable value at the end of the actual excitation period, the power decreases gradually from the second laser pulse, and the power is recovered to the original stable value after a certain level of period elapses. That is, as illustrated in FIG. 3, the applicant of the present application found the new problem that a "drop" (indicated by the numeral "DR" in FIG. 3) can be generated in the peak power of the output laser pulse. A phenomenon in which the peak power decreases gradually from a rise portion of the pulse laser and increases later, depends on driving conditions such as the repetitive frequency and the pulse laser output. In an interval of the low peak power, the intensity of the laser processing is lowered to hardly perform the homogeneous processing, and sometimes the processing itself is hardly performed.

Figures 4A, 4B:
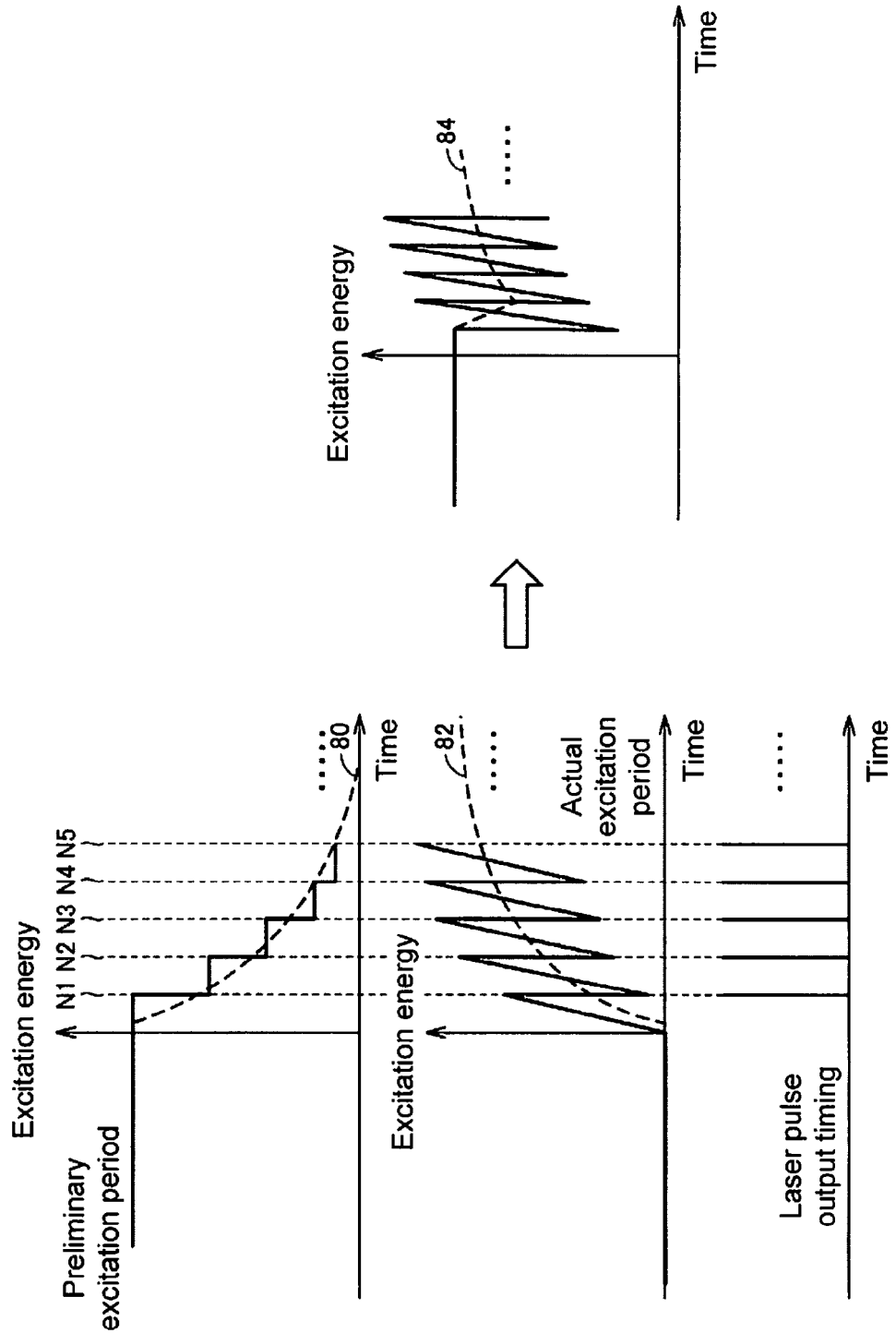
FIGS. 4(a) and 4(b) are diagrams illustrating a possible mechanism causing the problem in FIG. 3.

The following mechanism generating the drop in the peak power of the laser pulse immediately after the beginning of the laser pulse output as illustrated in FIG. 3 is estimated by the inventor of the present application. FIGS. 4(a) and 4(b) are diagrams illustrating a possible mechanism causing the problem in FIG. 3.

FIGS. 4(a) and 4(b) schematically illustrate a temporal change in excitation energy accumulated in the light amplifying fiber 1 in each of the preliminary excitation period and the actual excitation period.

As illustrated in FIG. 4(a), the excitation energy accumulated in the light amplifying fiber 1 in the preliminary excitation period is consumed by generation (N1) of the laser pulse immediately after the beginning of the laser pulse output. In this case, the excitation energy is not completely consumed but partially remains. On the other hand, because the excitation beam having the power P2 is incident on the light amplifying fiber 1 from the beginning of the actual excitation period, the accumulation (increase) of the excitation energy is started by the excitation beam having the power P2. The accumulation (increase) of the excitation energy progresses with a certain level of response delay. The excitation energy consumed by the initial laser pulse (N1) corresponds to a total of the excitation energy accumulated during the preliminary excitation period and the excitation energy accumulated during the actual excitation period. In order to maintain the peak power of the initial laser pulse (N1) at the same value as steady state, the excitation energy accumulated during the preliminary excitation period and the excitation energy accumulated in the steady state during the actual excitation period are adjusted so as to become the same level.

In FIG. 4(a), an average value of the excitation energy accumulated during the preliminary excitation period is indicated by a broken line 80, an average value of the excitation energy accumulated during the actual excitation period is indicated by a broken line 82. When the two average values of the increase and decrease of the excitation energy are combined, a temporal change indicated by a broken line 84 in FIG. 4(b) is obtained. It is found that the drop is generated immediately after the beginning of the actual excitation period in the temporal change (broken line 84) of the combined excitation energy. The drop becomes prominent in the case that the excitation energy accumulates the relatively large response delay after the beginning of the actual excitation period.

As illustrated in FIGS. 4(a) and 4(b), in the generated drop, an initial decrease rate is larger than an increasing rate generated later, time necessary for the return to the peak value in the steady state is longer than time necessary for the decrease of the peak value since immediately after the beginning of the laser pulse output.

D. Solutions

An outline of means for solving the problem will be described below. FIGS. 5 and 6 are diagrams illustrating the outline of the solutions adopted in the light amplifying device 50 of the embodiment.

In the light amplifying device 50 of the embodiment, as illustrated in FIG. 5, the power of the excitation beam is temporally changed according to a temporal waveform of the drop generated in the laser pulse, thereby compensating the decrease of the peak power generated in the laser pulse. That is, the driving circuit 22 adjusts the bias current supplied to the exciting LD 3 (increases the bias current to a value larger than the original value) according to decreasing timing and decreasing amount of the peak power of the laser pulse, thereby homogenizing the peak power of the output laser pulse.

In the example of FIG. 5, a correction waveform 31 substantially similar to the temporal waveform (envelope) of the drop generated in the peak power of the output laser pulse is overlapped on the excitation beam having the power P2. That is, the driving circuit 22 supplies the bias current to the exciting LD 3 after superposing the bias current corresponding to the correction waveform 31 in addition to the constant bias current necessary for the exciting LD 3 to generate the excitation beam having the power P2. When the bias current is corrected in the above manner, as illustrated in FIG. 6, the peak power of the laser pulse output from the light amplifying fiber 1 is homogeneously maintained from the beginning to the ending of the laser pulse output by providing the excitation beam to which the correction waveform 31 is added to the light amplifying fiber 1.

The power of the excitation beam supplied from the exciting LD 3 is changed from the power P1 to the power P2 at the beginning of the laser pulse output. On the other hand, in the case that the drop is generated, the power of the excitation beam supplied from the exciting LD 3 is temporarily increased to power P3 after the beginning of the laser pulse output. Then, the power of the excitation beam supplied from the exciting LD 3 is controlled so as to be gradually decreased from the power P3 to return to the power P2. As to a method for gradually decreasing the power of the excitation beam, the power of the excitation beam may exponentially be decreased with time, or the power of the excitation beam may be decreased with time by switching the power stepwise in a predetermined period, which will be described later. That is, any method can be adopted as long as a certain time is taken to gradually decrease the power.

After the beginning of the actual excitation period (emission period), the time (the period between the clock time T1 and the clock time T11) necessary for the change of the excitation beam from the power P2 to the power P3 is shorter than the time (the period between the clock time T11 and the clock time T12) necessary for the return of the excitation beam from the power P3 to the power P2. This corresponds to the temporal waveform of the drop that can be generated in the peak power of the laser pulse.

E. Implementation Examples

Some implementation examples performing the solutions in FIGS. 5 and 6 will be described below.

In the light amplifying device 50 of the embodiment, the controller 20 performs the control such that the power of the excitation beam emitted from the exciting LD 3 (excitation light source) is increased to power P3 (third-level power) higher than the power P2 (second-level power) after the beginning of the actual excitation period (emission period), and then such that the power of the excitation beam is gradually decreased from the power P3 to return to the power P2. A control logic of the controller 20 will be described in detail in the following implementation examples.

e1. First Implementation Example

As illustrated in FIG. 6, in order to temporally change the power of the excitation beam in the actual excitation period, preferably the bias current supplied to the exciting LD 3 is temporally changed according to the correction waveform 31. However, because a relatively short time width is generated in the correction waveform 31, the correction waveform 31 is approximated using a discrete pattern, and the bias current may be adjusted according to an approximate pattern of the correction waveform 31.

Figure 7:
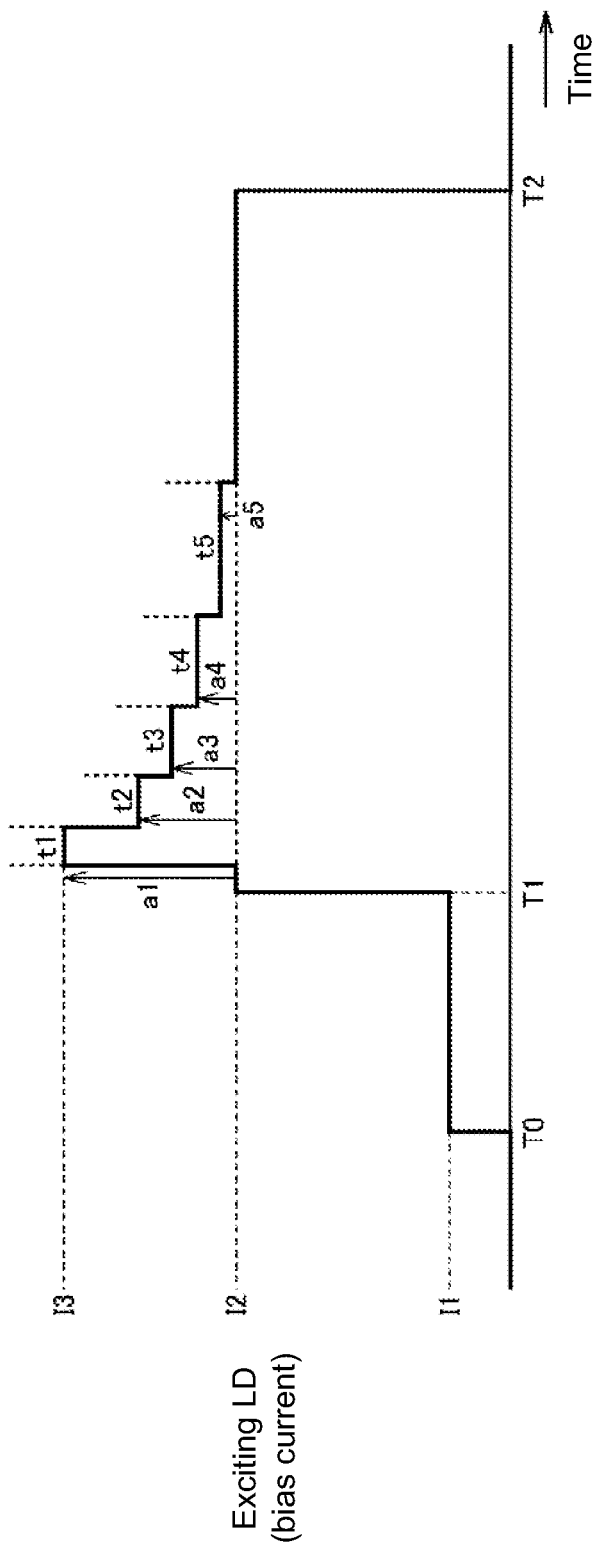
FIG. 7 is a diagram illustrating an example of an approximate pattern providing a correction waveform in FIG. 6.

FIG. 7 is a diagram illustrating an example of the approximate pattern providing the correction waveform in FIG. 6. As illustrated in FIG. 7, after the beginning of the emission period (after the clock time T1), the controller 20 decreases stepwise the driving current (bias current) supplied to the exciting LD 3 (excitation light source).

More specifically, as illustrated in FIG. 7, it is assumed that l1 is a current setting value in the preliminary excitation period as a basic setting value of the bias current supplied to the exciting LD 3 while l2 is a current setting value in the actual excitation period. Based on the beginning of the actual excitation period, time widths t1, t2, . . . , t5 are set, and correction values a1, a2, . . . , a5 are set in time widths t1, t2, . . . , t5, respectively. That is, the correction waveform 31 is approximated by combinations of the time widths t1, t2, . . . , t5 and the correction values a1, a2, . . . , a5. The combination of the time width and the correction value is set in each output setting value of the laser pulse. The power of the excitation beam is controlled by the bias current supplied from the driving circuit 22 to the exciting LD 3, and the bias current is arbitrarily approximated using the discrete value (digital data). Therefore, even in the relatively simple circuit configuration, the drop can be corrected to homogenize the peak power of the laser pulse.

Figure 8:
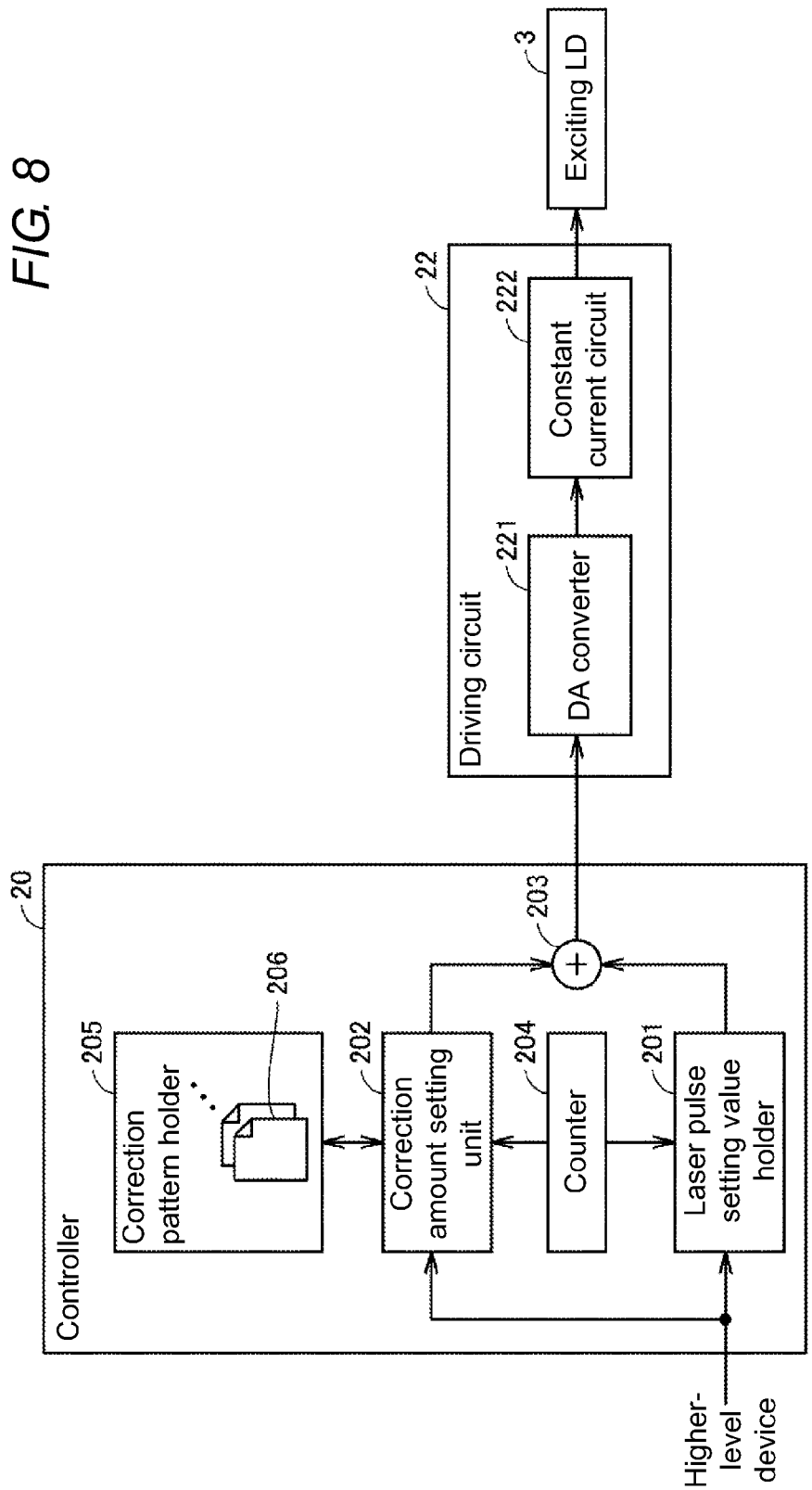
FIG. 8 is a diagram illustrating an example of a circuit configuration controlling a bias current supplied to an exciting LD using the approximate pattern in FIG. 7.

FIG. 8 is a diagram illustrating an example of the circuit configuration controlling the bias current supplied to the exciting LD 3 using the approximate pattern in FIG. 7. Referring to FIG. 8, the controller 20 includes a laser pulse setting value holder 201, a correction amount setting unit 202, an adder 203, a counter 204, and a correction pattern holder 205.

The laser pulse setting value holder 201 receives the output setting value (typically, the power P1 and power P2 in FIG. 6) of the laser pulse from the higher-level device 300 and holds the output setting value, and the laser pulse setting value holder 201 selectively outputs the output setting value to the adder 203 in predetermined timing based on a count value from the counter 204.

In predetermined timing based on a count value from the counter 204, the correction amount setting unit 202 selectively reads a parameter stored in the correction pattern holder 205, and outputs the parameter to the adder 203 as the output correction value.

The adder 203 adds the output setting value from the laser pulse setting value holder 201 and the output correction value from the correction amount setting unit 202, and outputs the sum to the driving circuit 22.

The counter 204 is a timing unit that manages a pulse period (repetitive frequency) or supply timing of the bias current supplied to the exciting LD 3.

The driving circuit 22 includes a DA (Digital to Analog) converter 221 and a constant current circuit 222. The DA converter 221 converts an output value from the controller 20 into an analog signal, and outputs the analog signal to the constant current circuit 222. The constant current circuit 222 supplies the bias current corresponding to the analog signal from the DA converter 221 to the exciting LD 3.

The use of the above configuration can perform the control of the bias current as illustrated in FIG. 7.

As described above, because the drop generated in the peak power of the output laser pulse changes depending on the driving conditions of the laser processing apparatus 100 and the light amplifying device 50, the correction amount added to the bias current is set in each output setting value of the laser pulse.

FIG. 9 is a diagram illustrating an example of the parameter set 206 held by the correction pattern holder 205 in FIG. 8. Referring to FIG. 9, the parameter set 206 includes one or a plurality of combinations of the time widths t1, t2, . . . , t5 and the correction values a1, a2, . . . , a5. The combinations of the time widths t1, t2, . . . , t5 and the correction values a1, a2, . . . , a5 are defined in each output setting value of the laser pulse. The correction pattern holder 205 selects the corresponding combination according to the output setting value of the laser pulse from the higher-level device 300, and calculates the output correction value. In the configuration, the controller 20 changes the bias current according to the previously-stored setting value (parameter set 206) that defines the driving current (bias current) in each time interval.

Because the optimum value of the output correction value added to the bias current varies depending on driving conditions such as the repetitive frequency and the pulse laser output, the parameter associated with each driving condition (typically, the output setting value of the laser pulse) is previously prepared, and the corresponding parameter is properly selected. In FIG. 9, by way of example, the parameter is set in association with the laser pulse setting value. Alternatively, in order to generate the output correction value, the parameter may be prepared in each of other setting values such as the repetitive frequency of the laser pulse.

e2. Second Implementation Example

Figure 10:
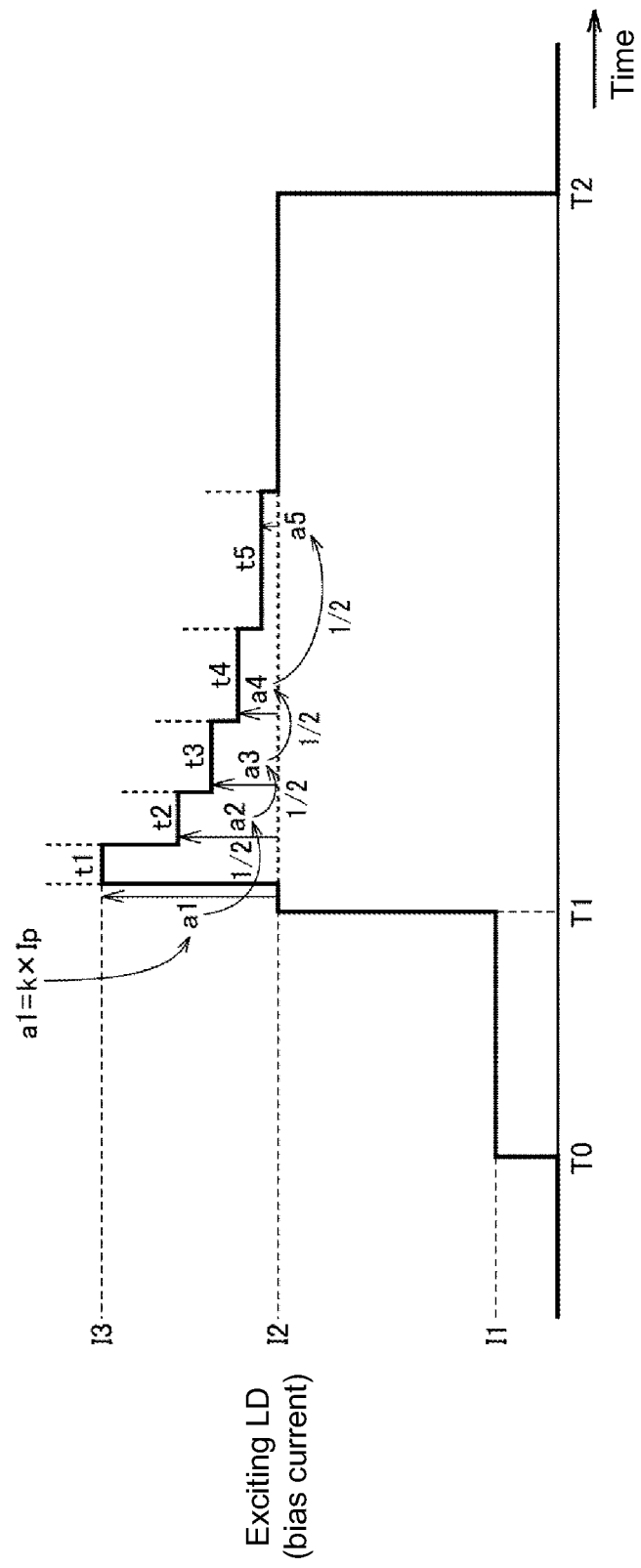
FIG. 10 is a diagram illustrating another example of the approximate pattern providing the correction waveform in FIG. 6.

In the first implementation example in FIGS. 9 to 11, it is necessary to previously set the correction values a1, a2, . . . , a5 to the intervals in each laser pulse setting value. Alternatively, the correction values a1, a2, . . . , a5 may further be simplified. For example, the correction value of the interval may be calculated by multiplying a predetermined coefficient by the correction value of the preceding interval.

FIG. 10 is a diagram illustrating another example of the approximate pattern providing the correction waveform in FIG. 6. As illustrated in FIG. 10, after the beginning of the emission period (after the clock time T1), the controller 20 decreases stepwise the driving current (bias current) supplied to the exciting LD 3 (excitation light source).

More specifically, the controller 20 sets a value (k×lp) in which a coefficient k (0<k<1) is multiplied by a bias current setting value lp to the correction value a1 of the time width t1, and sets the correction values of the time widths t2, t3, t4, and t5 like $a2=a1/2=k \times lp/2$, $a3=a2/2=k \times lp/2^2$, $a4=a3/2=k \times lp/2^3$, $a5=a4/2=k \times lp/2^4$.

That is, the controller 20 sequentially decreases the driving current (bias current) with a predetermined ratio. The gradually-decreased value corresponds to a kind of geometric progression. As the mechanism causing the problem is described above with reference to FIGS. 4(a) and 4(b), it is considered that the peak power changes exponentially with a certain level of response delay (for example, first-order delay system). Therefore, the exponential change can be compensated by sequentially multiplying the predetermined coefficient (for example, ½) by the correction value of the preceding interval as illustrated in FIG. 10. The sequentially-multiplied coefficient is not limited to ½, but any value (such as 1/e) can be used.

FIG. 11 is a diagram illustrating an example of a parameter set 210 providing the approximate pattern in FIG. 10. Referring to FIG. 11, the parameter set 210 includes bias current setting values lp1, lp2, lp3, . . . and coefficients k1, k2, k3, . . . . The bias current setting values lp1, lp2, lp3, . . . and the coefficients k1, k2, k3, . . . are associated with output setting values P21, P22, P23, . . . of the laser pulse, respectively. The corresponding bias current setting value and coefficient are selected according to the output setting value set from the higher-level device 300.

For the use of the configuration in FIG. 8, the parameter set 210 is stored in the correction pattern holder 205.

The use of the configuration in FIGS. 10 and 11 can correct the drop generated in the peak power of the laser pulse using fewer parameters.

e3. Third Implementation Example

A function indicating a relationship between the time and the bias current may previously be prepared in order to temporally change the power of the excitation beam in the actual excitation period as illustrated in FIG. 6.

For example, $Ib(t)=\alpha \times Ip \times \exp((-1/\beta) \times (t-\gamma))$ can be used as a function indicating the temporal change of a bias current Ib supplied to the exciting LD 3. Where $\alpha$ is a coefficient used to decide the initial bias current Ib from a bias current setting value Ip, $\beta$ is a time constant used to temporally gradually decrease the bias current, and $\gamma$ is a coefficient indicating a degree of response delay at which the compensation of the bias current Ib is started.

The use of the function can more accurately control the bias current using fewer parameters, and therefore the drop generated in the peak power of the laser pulse can be corrected with higher accuracy.

e4. Fourth Implementation Example

The correction amount of the bias current, which are calculated by the techniques of the first to third implementation examples, may further be corrected according to the output laser pulse and/or a processing result of the scanning mechanism 200. In this case, for example, the higher-level device 300 issues an instruction of the additional correction amount to the controller 20.

The use of the configuration of the fourth implementation example can properly perform the additional adjustment while observing the laser pulse or the processing result.

e5. Fifth Implementation Example

In the first to third implementation examples, the previously-defined correction amount is used. Alternatively, the laser pulse output may be monitored to dynamically decide the correction amount.

Figure 12:
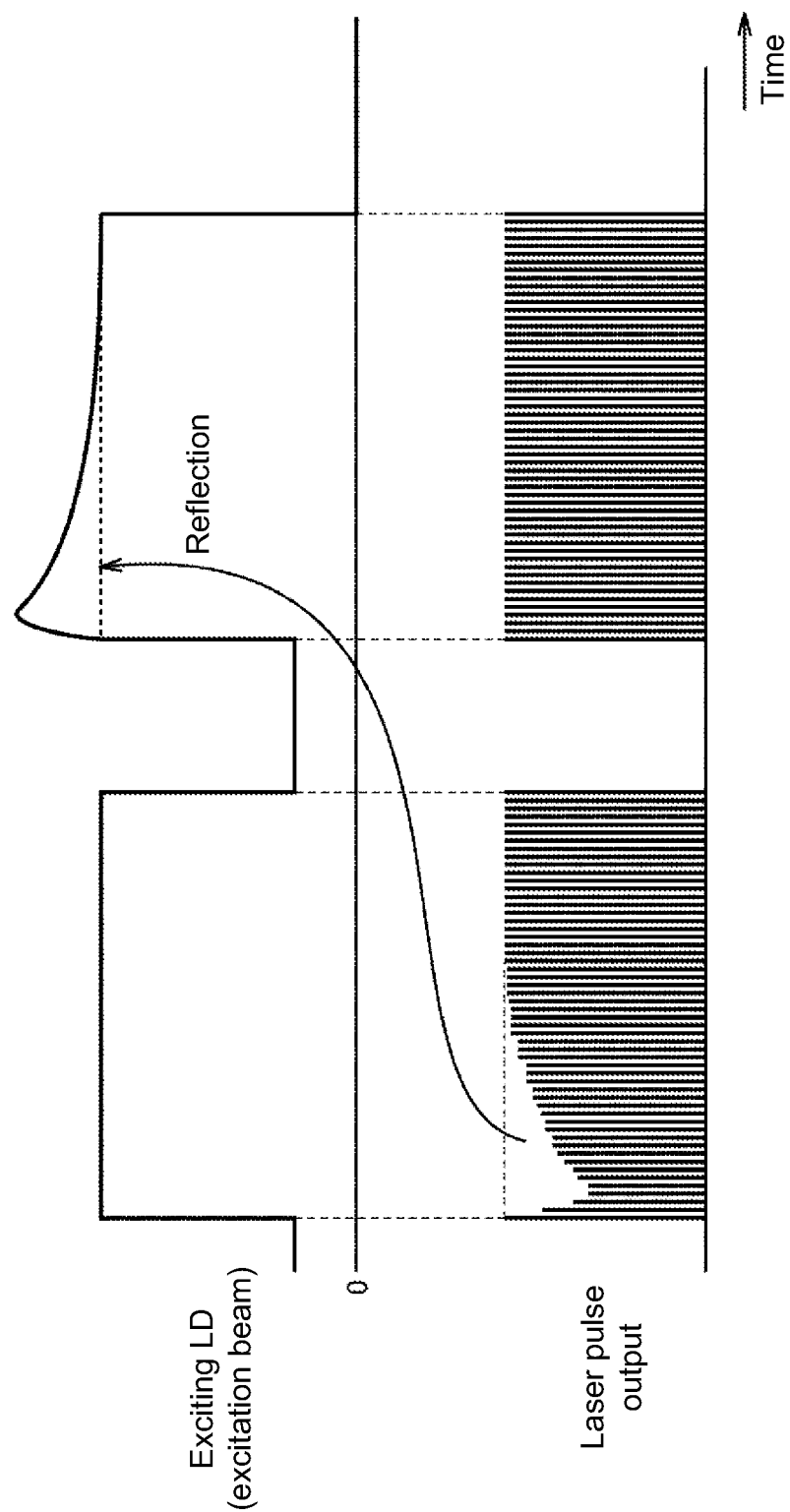
FIG. 12 is a diagram illustrating a method for deciding a correction amount with respect to the bias current supplied to the exciting LD by monitoring laser pulse output.

FIG. 12 is a diagram illustrating a method for deciding the correction amount with respect to the bias current supplied to the exciting LD 3 by monitoring the laser pulse output. Referring to FIG. 12, when the drop is generated in the temporal waveform of the laser pulse output in a certain preceding period, the drop is detected, and the temporal waveform of the excitation beam, namely, the bias current supplied to the exciting LD 3 is corrected in the subsequent period of the laser pulse output.

Because the generation of the phenomenon of the new problem in that the drop can be generated in the peak power of the laser pulse depends on the driving conditions such as the repetitive frequency and the pulse laser output, preferably the bias current is corrected only in the case that the drop is generated as illustrated in FIG. 12.

Figure 13:
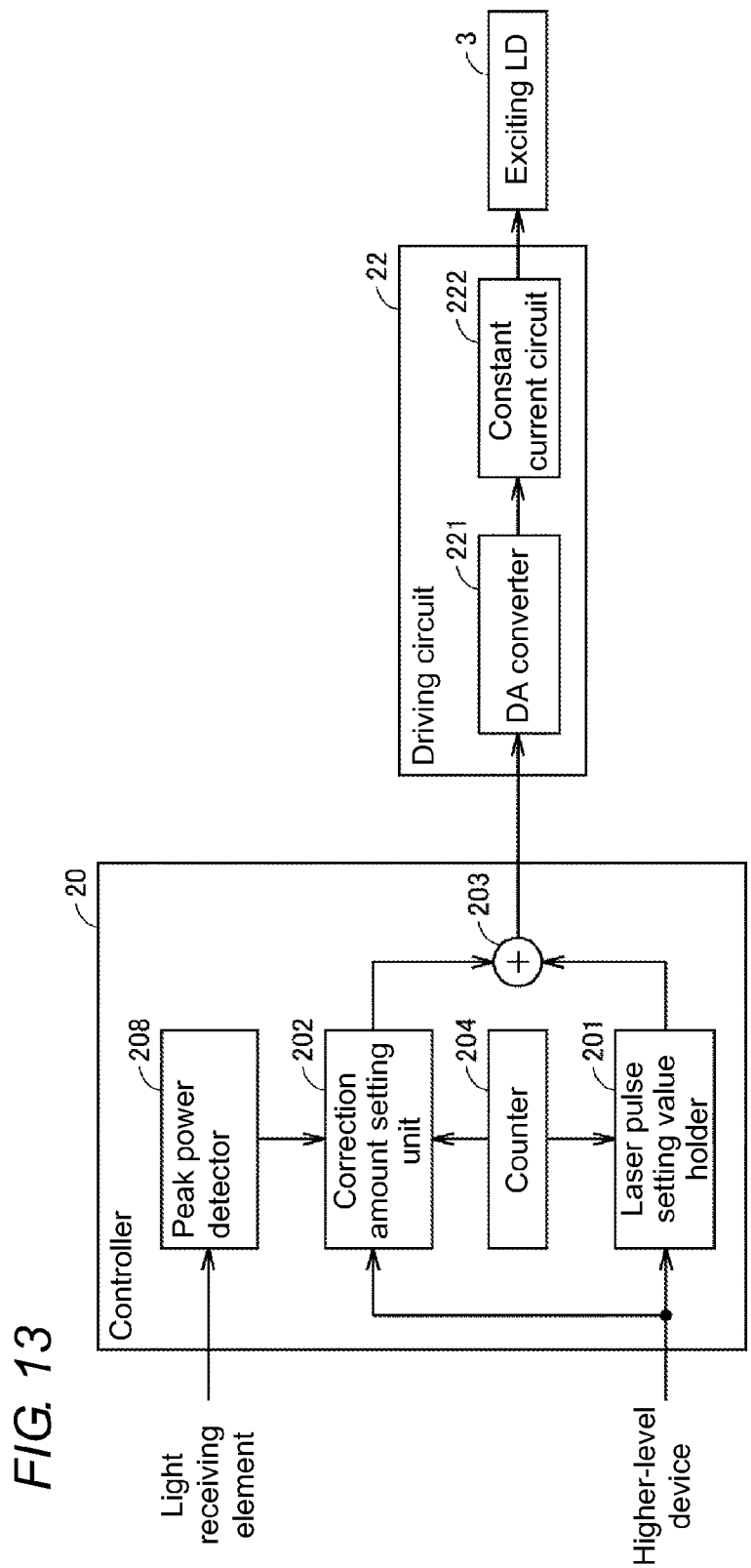
FIG. 13 is a diagram illustrating an example of a circuit configuration monitoring the laser pulse output in FIG. 12 to control the bias current supplied to the exciting LD.

FIG. 13 is a diagram illustrating an example of a circuit configuration monitoring the laser pulse output in FIG. 12 to control the bias current supplied to the exciting LD 3. Compared with the circuit configuration example in FIG. 8, the controller 20 in FIG. 13 includes a peak power detector 208 instead of the correction pattern holder 205.

The peak power detector 208 detects the temporal change of the peak value of the laser pulse detected by the light receiving element 14, and outputs a detection result to the correction amount setting unit 202. The light receiving element 14 and the peak power detector 208 provide a function of detecting the temporal change of the power generated in the amplified light beam (laser pulse) output from the light amplifying fiber 1.

The correction amount setting unit 202 calculates the existence or non-existence of the generation of the drop and the temporal change of the drop from a difference between the temporal change of the peak value detected by the peak power detector 208 and the peak value in the steady state (stable state). That is, the correction amount setting unit 202 provides a function of deciding a pattern used to temporally change the power of the excitation beam after the beginning of the emission period based on the temporal change of the power of the detected laser pulse. More specifically, the correction amount setting unit 202 decides the correction amount for the bias current supplied to the exciting LD 3 from the calculated temporal change of the drop, and outputs the correction amount to the adder 203.

The adder 203 decides the bias current supplied to the exciting LD 3 by adding the output setting value (the bias current in the steady state) from the laser pulse setting value holder 201 and the correction amount from the correction amount setting unit 202.

In the configuration of FIG. 12, by way of example, the drop is detected in the last period of the laser pulse output, and the bias current is corrected immediately after the period of the laser pulse output. When response speeds of the detection system and the bias current adjustment system are sufficiently high, the bias current may be corrected by performing feedback in real time. That is, a tendency to generate the drop is understood in a certain period of the laser pulse output, and the bias current may be corrected every time such that the drop is not generated. That is, the drop (a difference between the detected peak value and the peak value in the steady state) is detected during the laser pulse output, and feedback control is performed using a detection result of the drop, which allows the continuous stabilization of the peak power of the laser pulse.

The drop information detected by the method in FIG. 12 is stored while correlated with a type or a kind of the processing target processed at that time, and the correction amount for the bias current may be decided using the drop information ex post facto. A drop generation state is learned by the method in FIG. 12, and the necessary correction may be performed using the learned information. In the above learning method, when the temporal waveforms of the peak power are detected as many as the types (processing classifications) of the processing targets, it is not necessary to always perform the monitoring, so that the apparatus configuration or time and effort for the manipulation can be simplified.

e6. Processing Procedure

Figure 14:
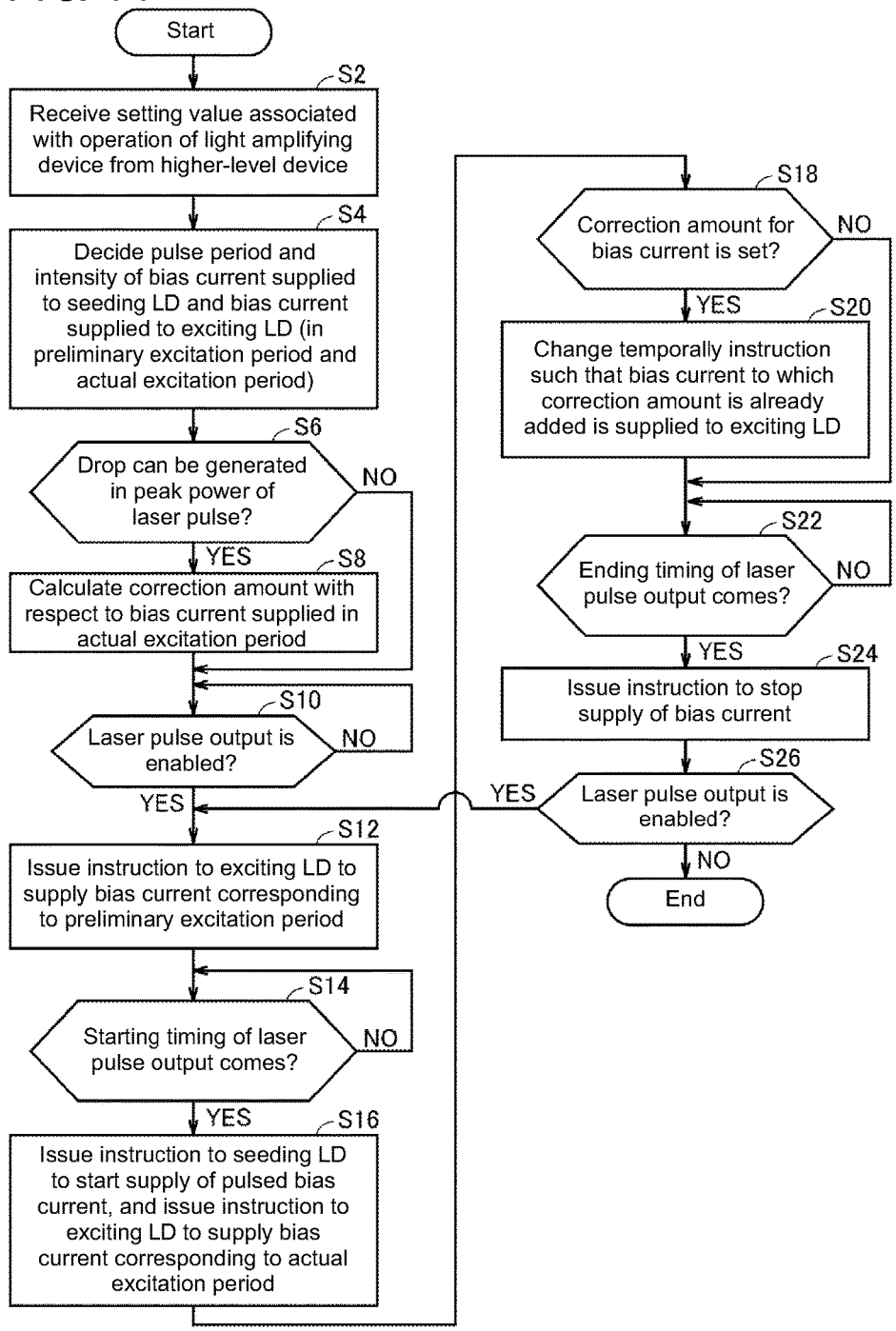
FIG. 14 is a flowchart illustrating a processing procedure of solutions of the embodiment.

A processing procedure of solutions of the embodiment will be described below. FIG. 14 is a flowchart illustrating the processing procedure of solutions of the embodiment. Each step in FIG. 14 is performed by the controller 20 of the light amplifying device 50. In the case that a general-purpose processor executes a program to implement the function of the controller 20, a program or a command code group, which performs the following steps, corresponds to the present invention.

Referring to FIG. 14, the controller 20 receives a setting value associated with operation of light amplifying device 50 from the higher-level device 300 (Step S2). Based on the received setting value, the controller 20 decides the pulse period (repetitive frequency) and intensity of the bias current supplied to the seeding LD 2 and the bias current supplied to the exciting LD 3 (in each of the preliminary excitation period and the actual excitation period) (Step S4).

When the drop can be generated in the peak power of the laser pulse (Yes in Step S6), the controller 20 calculates the correction amount for the bias current supplied in the actual excitation period (Step S8). Whether the drop can be generated may automatically be determined by the controller 20 based on the driving condition from the higher-level device 300, or explicitly be set by a user. When the drop can hardly be generated in the peak power of the laser pulse (NO in Step S6), the processing in Step S8 is skipped.

When the laser pulse output is enabled (Yes in Step S10), the controller 20 issues the instruction to the driving circuit 22 to supply the bias current corresponding to the preliminary excitation period to the exciting LD 3 (Step S12).

When starting timing of the laser pulse output comes (Yes in Step S14), the controller 20 issues the instruction to the driving circuit 21 to start the supply of the pulsed bias current to the seeding LD 2, and issues the instruction to the driving circuit 22 to supply the bias current corresponding to the actual excitation period to the exciting LD 3 (Step S16).

When the correction amount for the bias current is set (YES in Step S18), the controller 20 temporally changes the instruction issued to the driving circuit 22 such that the driving circuit 22 supplies the bias current to which the correction amount is already added to the exciting LD 3 (Step S20). On the other hand, when the correction amount is not set to the bias current (NO in Step S18), the processing in Step S20 is skipped.

Finally, when ending timing of the laser pulse output comes (Yes in Step S22), the controller 20 issues the instruction to the driving circuit 21 to stop the supply of the bias current (Step S24). While the laser pulse output is enabled (Yes in Step S26), the pieces of processing from Step S12 are repeated.

In the flowchart of FIG. 14, any one of the above implementation examples may be used in the calculation of the correction amount for the bias current (Step S8) and the compensation of the bias current supplied to the exciting LD 3 (Step S22). Alternatively, any combination of the above implementation examples may be used in the calculation of the correction amount for the bias current (Step S8) and the compensation of the bias current supplied to the exciting LD 3 (Step S22).

F. Processing for Short Non-Processing Period

As described above with reference to FIGS. 3 and 4, it is considered that the problem in that the power of the laser pulse can temporally change is caused by the decrease in excitation energy accumulated in the light amplifying fiber. On the other hand, there are various processing targets and processing contents of the laser processing apparatus 100, and the laser processing apparatus 100 is also applied to the case that the laser pulse is intermittently output while the light amplifying fiber is maintained at the high excitation state. In this case, there is a low possibility of generating the drop in the peak power of the laser pulse, and sometimes the bias current supplied to the exciting LD 3 needs not to be corrected.

Figure 15:
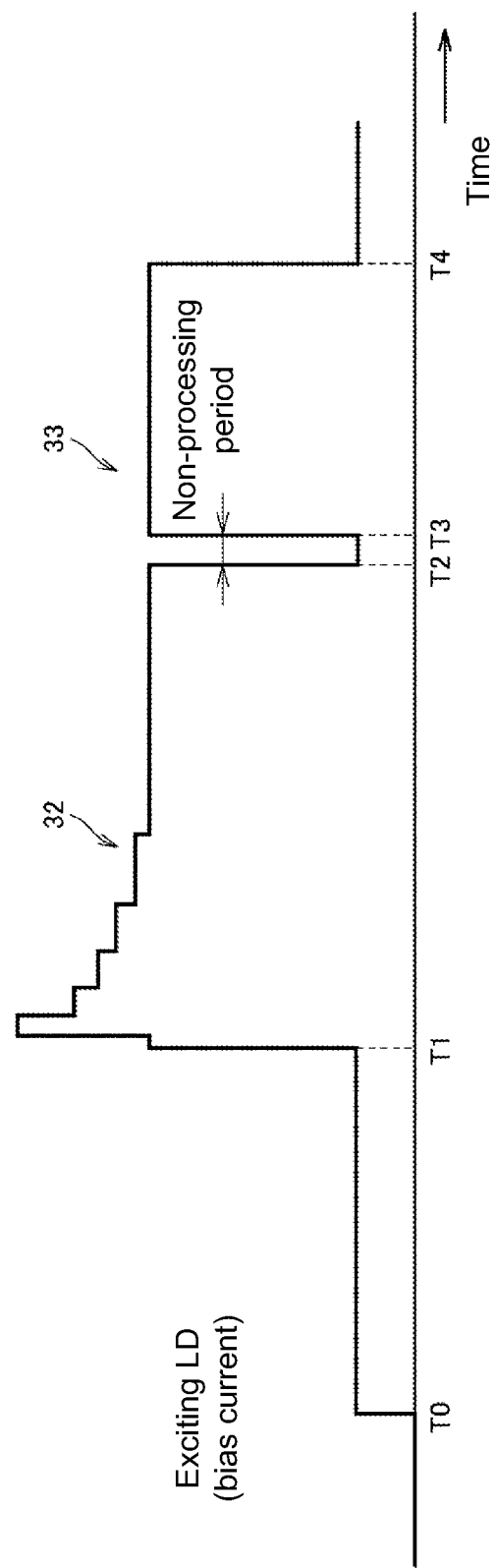
FIG. 15 is a diagram illustrating an example of a relatively short emission interval of the laser pulse output from the laser processing apparatus of the embodiment.

FIG. 15 is a diagram illustrating an example of a relatively short emission interval of the laser pulse output from the laser processing apparatus 100 of the embodiment. In the example of FIG. 15, the laser pulse is output in the two-time period (the period between the clock times T1 and T2 and the period between the clock times T3 and T4). In the first period of the laser pulse output, a bias current 32 supplied to the exciting LD 3 is corrected in order to prevent the generation of the drop. On the other hand, a bias current 33 supplied to the exciting LD 3 is not corrected in the second period of the laser pulse output. It is considered that, because the interval (the period between the clock times T2 and T3) of the period of the laser pulse output is relatively short, the drop is not generated even if the bias current is not corrected. That is, the excitation energy accumulated in the first period of the laser pulse output remains at the beginning of the second period of the laser pulse output, and the remaining excitation energy is consumed to be able to compensate the response delay of the increase in excitation energy of the excitation beam from the exciting LD 3.

Therefore, in the case that the period (the period between the clock times T2 and T3 in FIG. 15: hereinafter, referred to as a "non-processing period" because of the period in which the laser processing apparatus 100 does not process the processing target 250) until the beginning of the laser pulse output in the next period of the laser pulse output since the ending of the laser pulse output in the last period of the laser pulse output is relatively short in such a use form that the laser pulse is intermittently output in the period of the laser pulse output having a certain time width, the bias current supplied to the exciting LD 3 needs not to be corrected. Alternatively, the correction amount added to the bias current may be decreased.

As to a specific implementation form, whether the bias current supplied to the exciting LD 3 is corrected or whether the correction amount for the bias current is decreased may be decided based on whether a time length of the non-processing period is longer than a predetermined threshold time. A fixed value previously obtained by an experiment may be used as the threshold time, or dynamically be decided according to a length of the last period of the laser pulse output or the pulse period (repetitive frequency) of the laser pulse output in the period of the laser pulse output. It is considered that the more excitation energy remains in the light amplifying fiber when the last period of the laser pulse output is longer or when the pulse period is lower. In such cases, the threshold time may relatively be lengthened.

Thus, a frequency that the exciting LD 3 emits the excitation beam exceeding the power in the steady state is adjusted by correcting the bias current as necessary, so that the damage to the exciting LD 3 can be reduced.

G. Application Example of Laser Processing Apparatus

Application using not only the on and off control of the laser pulse, but also strength and weakness control of the power of the laser pulse can be used in the laser processing apparatus 100 of the embodiment. That is, not only the peak power of the laser pulse is kept constant, but also the bias current supplied to the exciting LD is adjusted to be able to perform shading processing by one-time scanning exciting LD.

Figure 16:
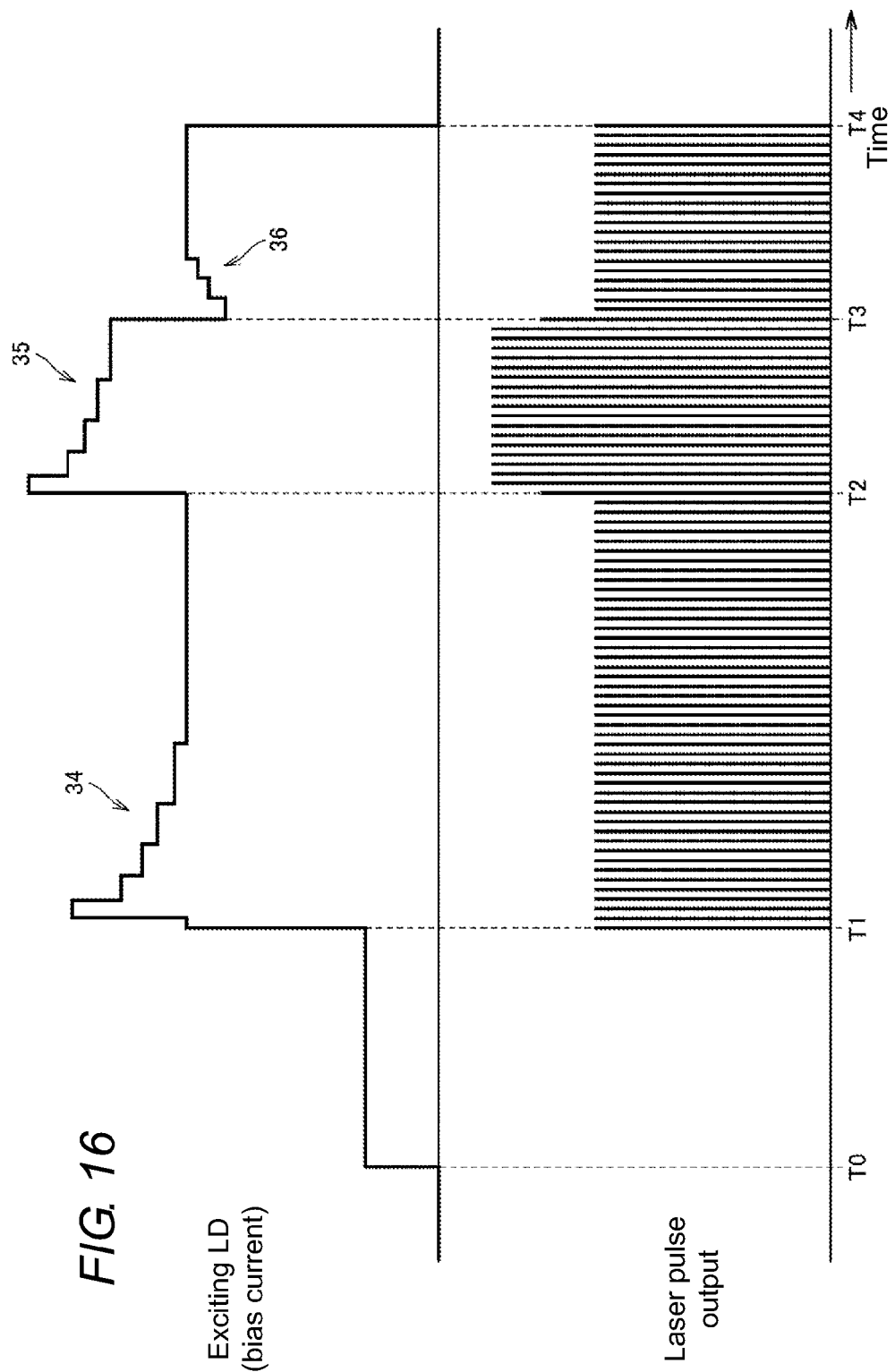
FIG. 16 is a diagram illustrating a temporal waveform in shading processing performed by the laser processing apparatus of the embodiment.

FIG. 16 is a diagram illustrating a temporal waveform in shading processing performed by the laser processing apparatus 100 of the embodiment. Referring to FIG. 16, the laser pulse having the first-peak power is output at the interval between the clock times T1 and T2 and the interval between the clock times T3 and T4, and the laser pulse having the second-peak power larger than the first-peak power is output at the interval between the clock times T2 and T3.

As to a more specific application, assuming that the processing target 250 is made of metal, a post-processing surface of the processing target 250 becomes white because of a relatively low processing degree at the interval between the clock times T1 and T2 and the interval between the clock times T3 and T4, and the post-processing surface of the processing target 250 becomes black because of a relatively high processing degree at the interval between clock times T2 and T3.

Even in performing the shading processing, preferably the bias current supplied to the exciting LD 3 is corrected based on the above knowledge in consideration of the response delay of the increase or decrease of the excitation energy in the light amplifying fiber.

More specifically, as illustrated in FIG. 16, a bias current 34 is corrected so as to increase immediately after the beginning of the laser pulse output (after the clock time T1), and a bias current 35 is also corrected so as to increase immediately after the power of the laser pulse increases stepwise (after the clock time T2). On the other hand, a bias current 36 is corrected so as to increase immediately after the power of the laser pulse decreases stepwise (after the clock time T3).

Thus, the response delay of the accumulation or emission of the excitation energy in the light amplifying fiber can be compensated by increasing or decreasing the excitation beam compared with the excitation beam in the steady state.

H. Plural-Stage Configuration

The light amplifying device 50 including the one-stage fiber amplifier is described above, and the present invention can also be applied to a configuration including a plural-stage fiber amplifier.

Figure 17:
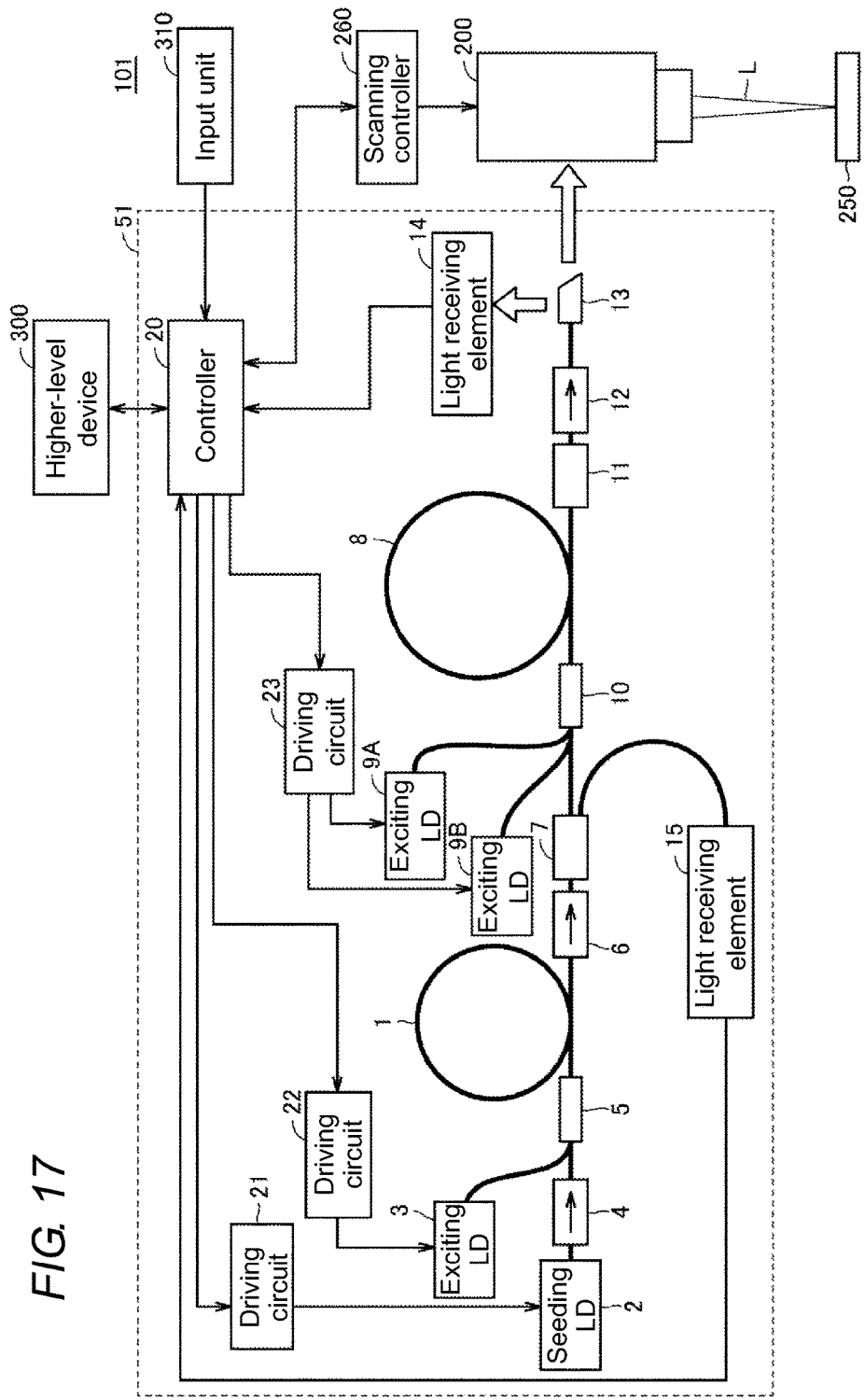
FIG. 17 is a configuration diagram illustrating a laser processing apparatus according to a modification of the embodiment.

FIG. 17 is a configuration diagram illustrating a laser processing apparatus according to a modification of the embodiment. Referring to FIG. 17, a laser processing apparatus 101 includes a light amplifying device 51 including a two-stage fiber amplifier. Compared with the laser processing apparatus 100 in FIG. 1, the laser processing apparatus 101 further includes an isolator 6, a coupler 7, a light amplifying fiber 8, exciting LDs 9A and 9B, a combiner 10, a light receiving element 15, and a driving circuit 23.

The light amplifying fiber 8 and the exciting LDs 9A and 9B are basic components of the MOPA-system fiber amplifier. However, the light amplifying fiber 8 and the exciting LDs 9A and 9B are a second-stage amplifier that amplifies the seed beam (laser pulse) output from the preceding amplifier. The seed beam (laser pulse) output from the light amplifying fiber 1 is further amplified by the light amplifying fiber 8, and output from the light amplifying fiber 8 toward the scanning mechanism 200.

The seed beam from the preceding amplifier (light amplifying fiber 1) and the excitation beams from the exciting LDs 9A and 9B are incident on the light amplifying fiber 8 while coupled to each other by the combiner 10.

The exciting LDs 9A and 9B are laser beam sources, and excitation light sources that emit the excitation beams in order to excite the atoms of the rare-earth element added to the core of the light amplifying fiber 8. The driving circuit 23 drives the exciting LDs 9A and 9B in response to the instruction from the controller 20.

The isolator 6 passes the seed beam (laser pulse), which is amplified by and output from the light amplifying fiber 1, and blocks the light beam returning to the light amplifying fiber 1.

The coupler 7 is provided on an optical path from the isolator 6 to the combiner 10. The coupler 7 divides the seed beam (laser pulse) output from the light amplifying fiber 1 through the isolator 6 into the laser pulse delivered to the combiner 10 and the laser pulse delivered to the light receiving element 15.

The light receiving element 15 receives the laser pulse output from the coupler 7, and outputs the signal indicating intensity of the laser pulse to the controller 20. For example, the light receiving element 15 includes a photodiode. The signal output from the light receiving element 15 may include the peak power (peak value) of the received laser pulse.

The characteristics of optical elements such as the seeding LD 2, the exciting LD 3, 9A, and 9B, and the isolators 4, 6, and 12 can change depending on temperature. Therefore, preferably a temperature controller is provided in the laser processing apparatus 101 in order to keep the temperature of the optical element constant.

Because other components are similar to those of the laser processing apparatus 100 in FIG. 1, the detailed description is omitted.

In the whole light amplifying device 51 of FIG. 17, the excitation beams (excitation energy) are supplied to the light amplifying fibers from the exciting LD 3 and the exciting LDs 9A and 9B, respectively. The exciting LD 3 and the exciting LDs 9A and 9B are controlled in a coordinated manner in order to implement the solutions in FIGS. 5 and 6, and therefore the excitation beam is totally supplied so as to compensate the drop in the peak power of the laser pulse. The coordinated control of the exciting LD 3 and the exciting LDs 9A and 9B, namely, a power balance between the excitation beams supplied from the exciting LD 3 and the exciting LDs 9A and 9B may be adjusted in an experimental and/or empirical manner.

Thus, even in the configuration including the plural-stage fiber amplifier in FIG. 17, the stable laser pulse can be output from the final amplifying stage (light amplifying fiber). The number of plural stages is not limited to the two stages, but three stages or more may be used. In the configuration of FIG. 17, the one exciting LD 3 is provided at the first stage, and the two exciting LDs 9A and 9B are provided at the second stage. However, the present invention is not limited to this configuration, and the number of exciting LDs can properly be designed according to required performance or performance of an associated optical member.

I. Conclusion

As described above, in the light amplifying device 50 of the embodiment, the power of the excitation beam is temporally changed according to a temporal waveform of the drop generated in the laser pulse, thereby compensating the decrease of the peak power that can be generated in the laser pulse. The use of the compensation processing can stably output the laser pulse having the homogeneous peak power from the beginning of the laser pulse output. Therefore, the laser processing or printing can be performed with high quality.

It is noted that the disclosed embodiments are not restrictive but illustrative in every way. The scope of the present invention is not indicated by the above description but by the claims, and the meanings equivalent to the claims and all the changes within the claims are included in the present invention.

The invention claimed is:

1. A light amplifying device comprising:
a seed light source configured to emit a pulsed seed beam;
an excitation light source configured to emit an excitation beam;
a light amplifying fiber configured to amplify the seed beam with the excitation beam; and
a controller configured to control light beams emitted from the seed light source and the excitation light source,
wherein the controller
causes the seed light source to emit the seed beam in an emission period in which the light amplifying fiber outputs the amplified light beam,
causes the excitation light source to emit the excitation beam having first-level power in a non-emission period immediately before the emission period,
changes the power of the excitation beam emitted from the excitation light source to a second level higher than the first level at a beginning of the emission period,
increases the power of the excitation beam emitted from the excitation light source to a third level higher than the second level after starting of the emission period, and
decreases gradually the power of the excitation beam from the third level to the second level.

2. The light amplifying device according to claim 1, wherein, after the starting of the emission period, a time necessary for the change in power of the excitation beam from the second level to the third level is shorter than a time necessary for return of power of the excitation beam from the third level to the second level.

3. The light amplifying device according to claim 1, wherein
the power of the excitation beam emitted from the excitation light source depends on a driving current supplied to the excitation light source, and
the controller decreases stepwise the driving current supplied to the excitation light source after the starting of the emission period.

4. The light amplifying device according to claim 3, wherein the controller changes the driving current according to a previously-stored setting value in which the driving current is defined in each time interval.

5. The light amplifying device according to claim 3, wherein the controller sequentially decreases the driving current with a predetermined ratio.

6. The light amplifying device according to claim 1, wherein the controller comprises:
a unit configured to detect a temporal change in power of the amplified light beam output from the light amplifying fiber; and
a unit configured to decide a pattern temporally changing the power of the excitation beam after the starting of the emission period based on the temporal change in power of the amplified light beam detected.

7. A laser processing apparatus comprising:
the light amplifying device according to any one of claims 1; and
a scanning mechanism configured to irradiate a processing target with the amplified light beam output from the light amplifying device.

* * * * *